(12) United States Patent
Tanaka et al.

(10) Patent No.: US 7,911,916 B2
(45) Date of Patent: Mar. 22, 2011

(54) BEAM APPLYING METHOD, BEAM APPLYING APPARATUS, AND OPTICAL RECORDING MEDIUM

(75) Inventors: Kenji Tanaka, Tokyo (JP); Atsushi Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 12/107,556

(22) Filed: Apr. 22, 2008

(65) Prior Publication Data

US 2009/0323496 A1    Dec. 31, 2009

(30) Foreign Application Priority Data

May 15, 2007  (JP) ................................ 2007-129193

(51) Int. Cl.
*G11B 7/00* (2006.01)
(52) U.S. Cl. .................... 369/100; 369/103; 369/112.16
(58) Field of Classification Search ............... 369/44.32, 369/44.17, 100, 103, 110.01, 112.01, 112.16
See application file for complete search history.

(56) References Cited

U.S. PATENT DOCUMENTS

2004/0165518 A1* 8/2004 Horimai et al. ................ 369/94

FOREIGN PATENT DOCUMENTS

| JP | 2003-039001 | 2/2003 |
|----|-------------|--------|
| JP | 2005-174401 | 6/2005 |
| JP | 2006-163021 | 6/2006 |
| JP | 2006-344344 | 12/2006 |
| JP | 2007-102185 | 4/2007 |
| WO | 2005-109117 | 11/2005 |

OTHER PUBLICATIONS

Japanese Office Action dated Apr. 14, 2009, for corresponding JP Patent Application 2007-129193.

* cited by examiner

*Primary Examiner* — Thang V Tran
*Assistant Examiner* — Brenda Bernardi
(74) *Attorney, Agent, or Firm* — K&L Gates LLP

(57) ABSTRACT

A beam applying method includes the steps of: rotationally driving an optical recording medium, in which a signal is recorded and reproduced by applying a beam thereto and which has a recording layer on which the signal is recorded, a polarization element formed below the recording layer, and a reflecting film formed below the polarization element; and applying a beam to the rotating optical recording medium through a half-wavelength plate that is rotationally driven with the rotation of the optical recording medium.

9 Claims, 22 Drawing Sheets

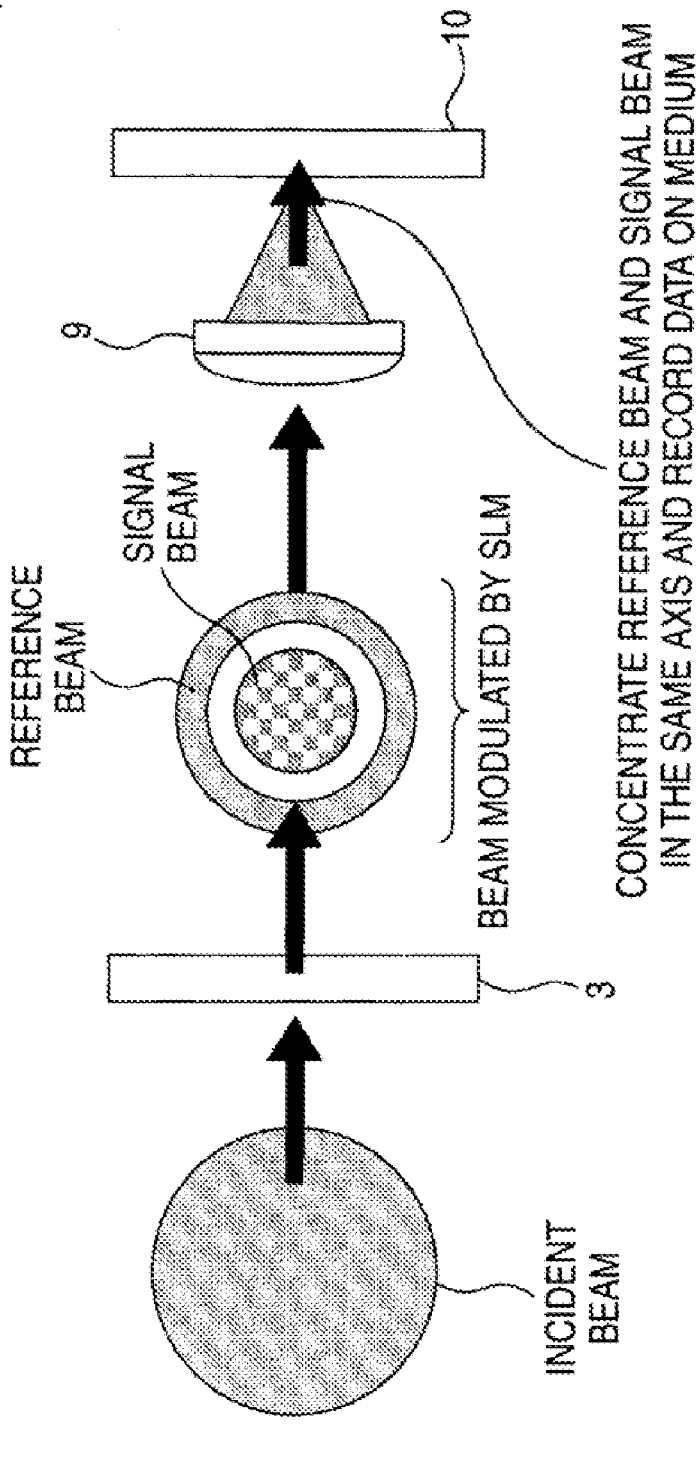

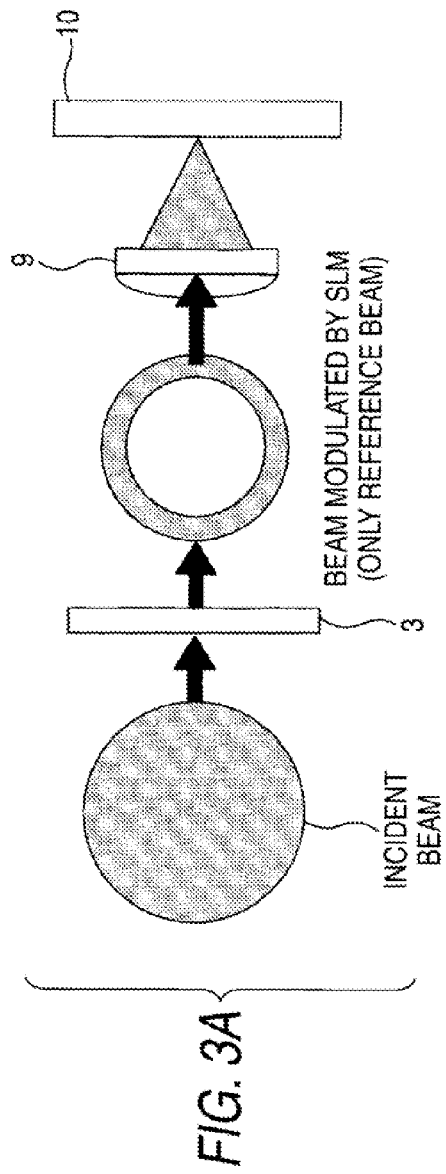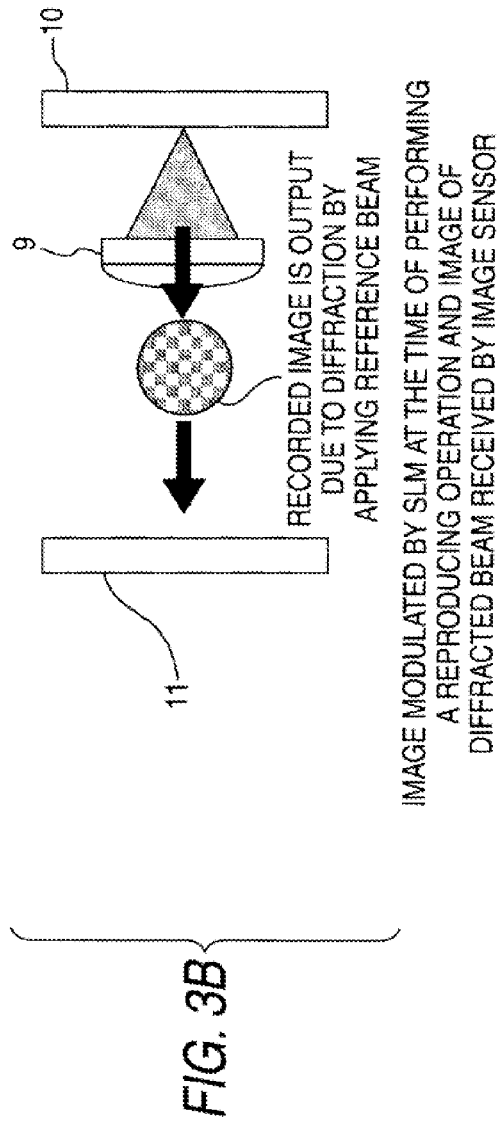

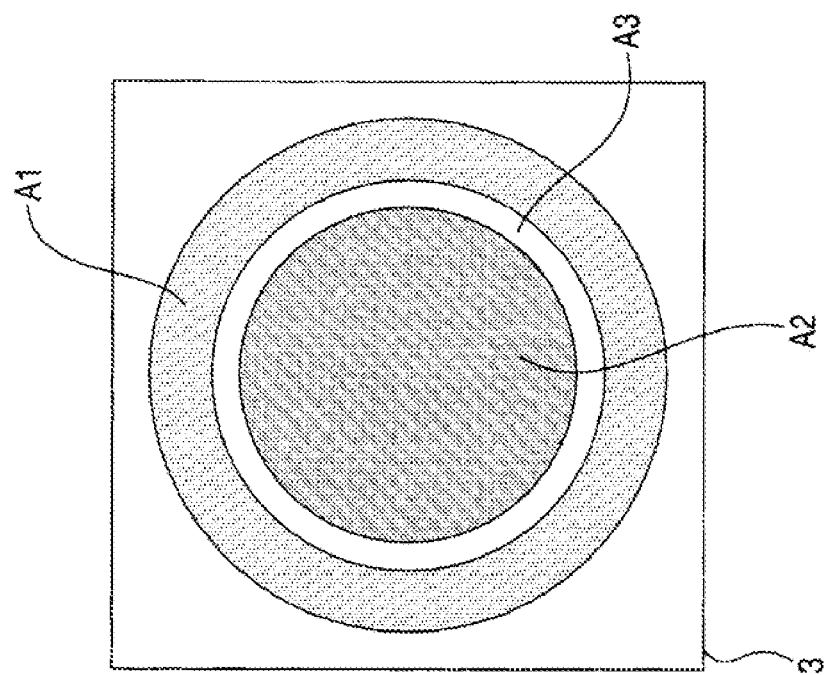

FOURTH TECHNIQUE

↔ : POLARIZATION DIRECTION OF INCIDENT BEAM

⇢ : OPTICAL AXIS DIRECTION (CONTINUOUSLY VARY ALONG MEDIUM ROTATING DIRECTION)

PATTERN A: SIGNAL BEAM (FORWARD PATH) x REFERENCE BEAM (FORWARD PATH)

PATTERN B: SIGNAL BEAM (FORWARD PATH) x REFERENCE BEAM (BACKWARD PATH)

PRIOR ART

PATTERN C: SIGNAL BEAM (BACKWARD PATH) x REFERENCE BEAM (FORWARD PATH)

PATTERN D: SIGNAL BEAM (BACKWARD PATH) x REFERENCE BEAM (BACKWARD PATH)

PRIOR ART

PRIOR ART

_US 7,911,916 B2_

BEAM APPLYING METHOD, BEAM APPLYING APPARATUS, AND OPTICAL RECORDING MEDIUM

CROSS REFERENCES TO RELATED APPLICATIONS

The present application claims priority to Japanese Patent Application JP 2007-129193 filed in the Japanese Patent Office on May 15, 2007, the entire contents of which is incorporated herein by reference.

BACKGROUND

The present application relates to a beam applying method and a beam applying apparatus that records or reproduces a signal in or from an optical recording medium in or from which a signal is recorded or reproduced by applying a beam thereto, and an optical recording medium.

In a hologram recording and reproducing system in the field of optical storage, a spatial light modulator (SLM) such as a transmissive liquid crystal panel and a digital micro mirror device (DMD) is used as a light intensity modulator and the intensity of a signal beam is modulated to obtain a pattern arrangement of bit1 (for example, light intensity=high) and bit0 (for example, light intensity=low).

At this time, the SLM generates the signal beam by modulating the light intensity of a beam at the center thereof on the basis of recording data and generates a reference beam by allowing a beam to pass through the periphery thereof in a ring shape. The signal beam modulated on the basis of the recording data is applied to a hologram recording medium along with the reference beam, whereby an interference pattern of the signal beam and the reference beam is recorded as data in the hologram recording medium.

At the time of reproducing data, a diffracted beam corresponding to the interference pattern is obtained by allowing the SLM to generate only the reference beam and applying the generated reference beam to the hologram recording medium. An image corresponding to the diffracted beam is formed on an image sensor such as a CCD (Charge Coupled Device) sensor and a CMOS (Complementary Metal-Oxide Semiconductor) sensor and values of the recorded bits are obtained, thereby reproducing the data.

Accordingly, the hologram recording and reproducing system in which a signal beam and a reference beam are applied in the same optical axis is known as a coaxial system.

Here, in the hologram recording and reproducing system, when a reflecting hologram recording medium (a hologram recording medium having a reflecting film) is used as the hologram recording medium, optical technologies of an optical disk such as a CD (Compact Disc) or a DVD (Digital Versatile Disc) can be sufficiently used, but a hologram formed by applying a signal beam and a reference beam is complicated.

FIGS. 20A, 20B, 21A, and 21B show patterns of holograms which can be formed at the time of recording data in a reflecting hologram recording medium.

As shown in FIGS. 20A to 21B, total 4 patterns of holograms can be formed when data are recorded in the reflecting hologram recording medium:

Pattern A; signal beam (forward path)×reference beam (forward path) =transmissive hologram Pattern B; signal beam (forward path)×reference beam (backward path)=reflective hologram Pattern C; signal beam (backward path)×reference beam (forward path)=reflective hologram Pattern D; signal beam (backward path)×reference beam (backward path)=transmissive hologram Specifically, the transmissive hologram of pattern A shown in FIG. 20A is a hologram formed by means of interference of both forward beams of a signal beam and a reference beam applied to the hologram recording medium through an objective lens as shown in the figure. The reflective hologram of pattern B shown in FIG. 20B is a hologram formed by means of interference of a forward beam of a signal beam applied to the hologram recording medium through the objective lens and a backward beam of a reference beam reflected from the hologram recording medium.

The reflective hologram of pattern C shown in FIG. 21A is a pattern opposite to pattern B, that is, a hologram formed by means of interference of a forward beam of the reference beam applied to the hologram recording medium through the objective lens and a backward beam of the signal beam reflected from the hologram recording medium. The transmissive hologram of pattern D shown in FIG. 21B is a hologram formed by means of interference of both backward beams of the reference beam and the signal beam reflected by the hologram recording medium.

The 4 holograms are difference from each other in characteristics of the interference pattern due to differences in traveling direction and angle and have different selectivity for medium shift and wavelength shift (for example, see M. Toishi et al. Appl. Opt., Vol. 45, No. 25, p. 6367 (2006)). Accordingly, it is not easy to correction the characteristics in the shifts, thereby causing a deterioration in SNR (S/N ratio).

A technique disclosed in U.S. Patent Application Publication No. 2003/0039001 is known to solve the above-mentioned problem.

In U.S. Patent Application Publication No. 2003/0039001, as shown in FIG. 22A, a quarter-wavelength plate is inserted as a layer in front of a reflecting film in the reflecting hologram recording medium. That is, a cover glass, a recording layer, and a reflecting film are formed sequentially from the uppermost layer in a general reflecting hologram recording medium, but the quarter-wavelength plate is inserted between the recording layer and the reflecting film in this case.

By using the above-mentioned hologram recording medium, it is possible to effectively prevent the reflective hologram from occurring. This is shown in FIG. 22B. As shown in the figure, for example, an X-linear polarized beam is applied to the hologram recording medium through the objective lens. The X-linear polarized beam applied to the hologram recording medium passes through the recording layer of the hologram recording medium, is converted into a right-rotated circularly-polarized beam as shown in the figure by passing through the quarter-wavelength plate, and then reaches the reflecting film below the quarter-wavelength plate. The circularly-polarized beam reaching the reflecting film is reflected therefrom and passes through the quarter-wavelength film again. Accordingly, the reflected beam from the hologram recording medium is obtained from the Y-linear polarized beam as shown in the figure.

According to the technique described in U.S. Patent Application Publication No. 2003/0039001, the forward beam to the hologram recording medium can be obtained by the use of the X-linear polarized beam and the backward beams as the reflected beam can be obtained by the use of the Y-linear polarized beam. That is, polarization directions of the forward beam and the backward beam are perpendicular to each other to prevent the interference of the forward beam and the backward beam, thereby effectively preventing the reflective hologram resulting from pattern B and pattern C.

SUMMARY

However, the technique disclosed in U.S. Patent Application Publication No. 2003/0039001 cannot be applied to performing a recording and reproducing operation while rotating the hologram recording medium.

That is, in order to convert an incident linearly-polarized beam having a polarization direction into a linearly-polarized beam having a polarization direction perpendicular to that of the incident linearly-polarized beam and output the converted linearly-polarized beam by the use of the quarter-wavelength plate disposed in the hologram recording medium, the optical axis direction of the quarter-wavelength plate needs to be kept inclined by 45° about the polarization direction of the incident beam. However, when the hologram recording medium is rotationally driven, the relation between the optical axis direction of the quarter-wavelength plate and the polarization direction of the incident beam cannot be kept constant. Accordingly, the technique described in U.S. Patent Application Publication No. 2003/0039001 cannot be applied to performing the recording and reproducing operation while rotating the hologram recording medium.

According to a first embodiment, there is provided a beam applying method including the steps of: rotationally driving an optical recording medium, in which a signal is recorded and reproduced by applying a beam thereto and which has a recording layer on which the signal is recorded, a polarization element formed below the recording layer, and a reflecting film formed below the polarization element; and applying a beam to the rotating optical recording medium through a half-wavelength plate that is rotationally driven with the rotation of the optical recording medium.

In this case, when a quarter-wavelength plate is formed as the polarization element disposed in the optical recording medium, as described above, it is necessary to keep 45° an angle formed by the optical axis direction of the quarter-wavelength plate of the optical recording medium and the polarization direction of a beam (a forward beam incident through the recording layer) incident on the quarter-wavelength plate. However, in the beam applying method according to the first embodiment, since a beam can be applied to the optical recording medium through the half-wavelength plate that is rotationally driven with the rotation of the optical recording medium, it is possible to apply a beam while keeping constant (for example, 45°) the angle formed by the optical axis direction of the quarter-wavelength plate of the optical recording medium and the polarization direction of the beam (forward beam incident through the recording layer) incident on the quarter-wavelength plate. That is, the polarization direction of the backward beam (transmissive hologram) can be always kept perpendicular to the polarization direction of the forward beam, thereby effectively preventing a reflective hologram from being recorded.

Alternatively, when an absorbing linear polarization element configured to absorb only a polarized beam in the polarization axis direction and to transmit a polarized beam perpendicular to the polarization axis direction is formed as the polarization element of the optical recording medium, it is also possible to obtain the same advantages. That is, when the absorbing linear polarization element is formed, the incident beam is absorbed so as not to generate the reflected beam (backward beam). However, it is necessary to match the polarization direction of the forward beam to the optical recording medium with the polarization axis direction of the absorbing linear polarization element. Here, in the beam applying method according to the first embodiment, since the beam is applied through the rotating half-wavelength plate, the polarization direction of the forward beam to the optical recording medium can be always kept parallel to the polarization axis direction of the absorbing linear polarization element. That is, it is possible to prevent the generation of the backward beam, thereby preventing the reflective hologram from being recorded.

According to a second embodiment, there is provided a beam applying method including the steps of: rotationally driving an optical recording medium, in which a signal is recorded and reproduced by applying a beam thereto and which has a recording layer on which the signal is recorded and a reflecting linear polarization element formed below the recording layer; and applying a beam to the rotating optical recording medium through a half-wavelength plate that is rotationally driven with the rotation of the optical recording medium.

Here, the reflecting linear polarization element means a polarization element configured to transmit only a polarized beam in the polarization axis direction and to reflect a polarized beam having a polarization direction perpendicular to the polarization axis direction.

In the optical recording medium, a reflecting film is not formed below the reflecting linear polarization element. That is, since the incident beam (forward beam) passes through the reflecting linear polarization element, the forward beam is output through the entire optical recording medium, thereby not generating the reflected beam (backward beam). Accordingly, the polarization direction of the forward beam to the optical recording medium is parallel to the polarization axis direction of the reflecting linear polarization element. However, in the beam applying method according to the second embodiment, by applying a beam to the optical recording medium through the rotating half-wavelength plate, it is possible to keep the polarization direction of the forward beam to the optical recording medium parallel to the polarization axis direction of the reflecting linear polarization element. That is, the forward beam can be made to pass through the entire the optical recording medium and thus the backward beam is prevented from being generated, thereby preventing the reflective hologram from being recorded.

According to another embodiment, there is provided a beam applying apparatus including: medium rotating means for rotationally driving an optical recording medium in which a signal is recorded and reproduced by applying a beam thereto; an optical system configured to guide the beam emitted from a light source to the optical recording medium; a half-wavelength plate inserted at a predetermined position in an optical path of the optical system; and wavelength plate rotating means for rotationally driving the half-wavelength plate with the rotation of the optical recording medium.

According to this configuration, it is possible to provide a beam applying apparatus that can prevent a reflecting hologram from being recorded by the use of the beam applying methods according to the first and second embodiments.

According to a third embodiment, there is provided a beam applying method including the steps of: rotationally driving an optical recording medium, in which a signal is recorded and reproduced by applying a beam thereto and which has a recording layer on which the signal is recorded, a quarter-wavelength plate which is formed below the recording layer and of which the optical axis continuously varies along the rotation direction of the optical recording medium, and a reflecting film formed below the quarter-wavelength plate; and applying a beam to the rotating optical recording medium.

Even when the optical recording medium is rotationally driven, the optical axis direction of the quarter-wavelength plate at an incidence position of a beam on the optical recording medium can be made to be always a predetermined direction by using a quarter-wavelength plate, the optical axis of which continuously varies along the rotation direction of the optical recording medium, as the quarter-wavelength plate disposed in the optical recording medium. Accordingly, in the beam applying method according to the third embodiment of rotationally driving the optical recording medium having the quarter-wavelength plate formed therein to apply a beam, the polarization direction of the backward beam can be always kept perpendicular to the polarization direction of the forward beam, thereby effectively preventing a reflective hologram from being generated.

According to another embodiment, there is provided an optical recording medium in which a signal is recorded and reproduced by applying a beam thereto, the optical recording medium including: a recording layer on which the signal is recorded; a quarter-wavelength plate which is formed below the recording layer and of which the optical axis continuously varies along the rotation direction of the optical recording medium; and a reflecting film formed below the quarter-wavelength plate.

According to this configuration, it is possible to provide an optical recording medium that can prevent a reflective hologram from being generated by the use of the beam applying method according to the third embodiment.

According to a fourth embodiment, there is provided a beam applying method including the steps of: rotationally driving an optical recording medium, in which a signal is recorded and reproduced by applying a beam thereto and which has a recording layer on which the signal is recorded, an absorbing circular polarization element formed below the recording layer, and a reflecting film formed below the absorbing circular polarization element; and applying a circularly-polarized beam in a predetermined rotation direction to the rotating optical recording medium.

The absorbing circular polarization element means a polarization element configured to absorb a circularly-polarized beam in a predetermined rotation direction and to transmit a circularly-polarized beam in the opposite rotation direction. Accordingly, as described above, by applying a circularly-polarized beam in a predetermined direction to the optical recording medium having the absorbing circular polarization element formed therein, it is possible to allow the absorbing circular polarization element to absorb the incident beam when the optical recording medium is rotationally driven. As a result, the forward beam can be made not to be generated, thereby preventing the recording of a reflective hologram.

According to a fifth embodiment, there is provided a beam applying method, comprising the steps of: rotationally driving an optical recording medium, in which a signal is recorded and reproduced by applying a beam thereto and which has a recording layer on which the signal is recorded and a reflecting circular polarization element formed below the recording layer; and applying a circularly-polarized beam in a predetermined rotation direction to the rotating optical recording medium.

The reflecting circular polarization element means a polarization element configured to transmit a circularly-polarized beam in a predetermined rotation direction and to reflect a circularly-polarized beam in the opposite rotation direction thereof. Accordingly, as described above, by applying a circularly-polarized beam of a predetermined rotation direction to the optical recording medium having the reflecting circular polarization element formed therein, the reflecting circular polarization element always transmits the incident beam when the optical recording medium is rotationally driven. In the optical recording medium, a reflecting film is not formed below the reflecting circular polarization element. Accordingly, when the reflecting circular polarization element transmits an incident beam, the incident beam is output through the entire optical recording medium. As a result, in the beam applying method according to the fifth embodiment, the forward beam can be made not to be generated, thereby preventing the recording of a reflective hologram.

According to the above-mentioned embodiments of the present application, even when an optical recording medium is rotationally driven to perform a recording operation, it is possible to prevent the occurrence of a reflective hologram, thereby preventing a reflective hologram from being recorded on the optical recording medium. In other words, it is possible to record only a transmissive hologram on the optical recording medium.

As described above, since the recording of the reflective hologram is prevented and only the transmissive hologram is recorded, it is possible to enhance the SNR.

In the beam applying methods according to the second, fourth, and fifth embodiments in which an incident beam is absorbed or the incident beam is output through the entire optical recording medium, since the generation of a backward beam can be prevented, the generation of the transmissive hologram resulting from the combination of "backward beam"דbackward beam" can be prevented and only the transmissive hologram resulting from the combination of "forward beam"ד forward beam" can be recorded. That is, it is possible to prevent the recording of the reflective hologram and to record only one of two kinds of transmissive holograms. Since only one kind of transmissive hologram can be recorded, it is possible to further enhance the SNR.

Additional features and advantages are described herein, and will be apparent from the following Detailed Description and the figures.

BRIEF DESCRIPTION OF THE FIGURES

FIG. 2 is a diagram illustrating a method of recording data on a hologram recording medium.

FIGS. 3A and 3B are diagrams illustrating a method of reproducing data from the hologram recording medium.

FIG. 4 is a diagram illustrating a reference beam area, a signal beam area, and a gap area defined in a spatial light modulator.

DETAILED DESCRIPTION

Hereinafter, the subject matter of the present application will be described in further detail with reference to the drawings in accordance with an embodiment.

Figure 1:
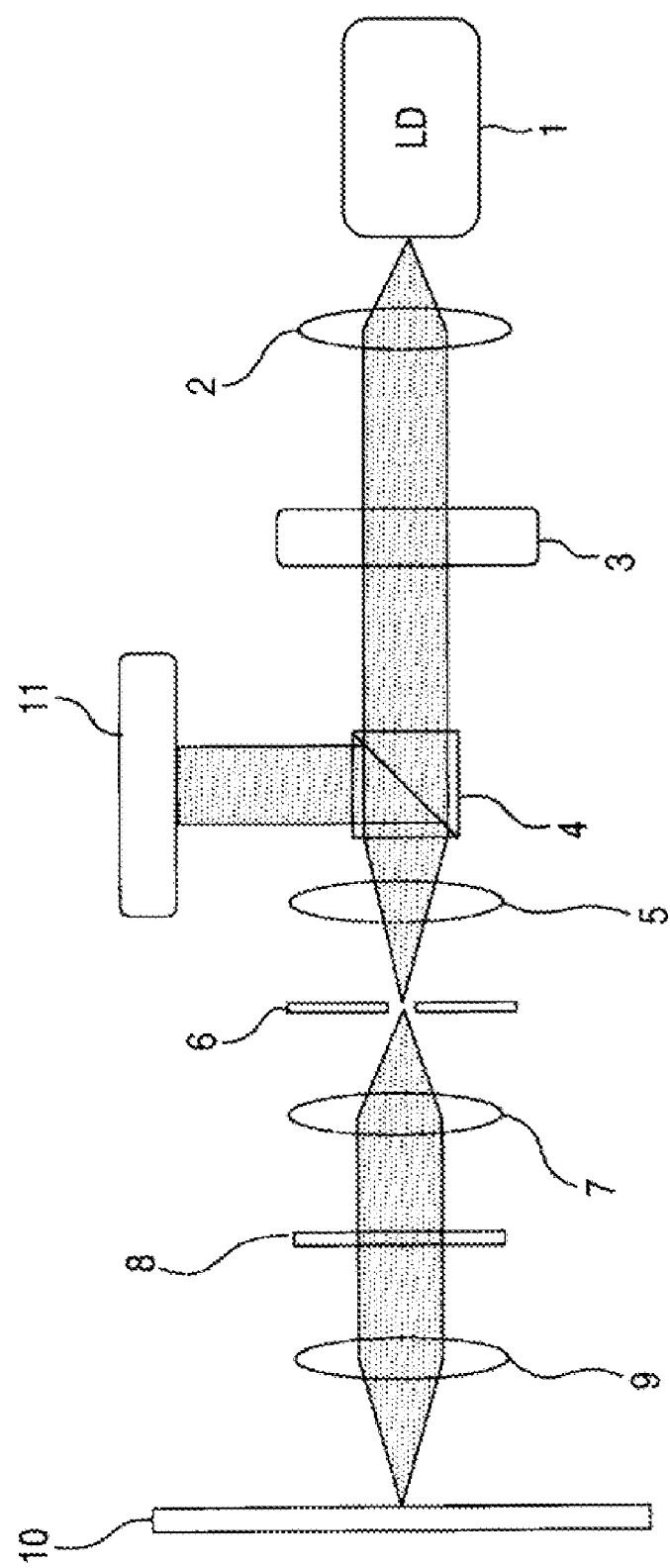
FIG. 1 is a diagram illustrating an internal configuration of a hologram recording and reproducing apparatus employing a coaxial system so as to explain basic hologram recording and reproducing operations.

A general outline of the _____
1. Basic Hologram Recording and Reproducing Operation
2. Beam Applying Method
2-1. First Technique
2-2. Second Technique
2-3. Third Technique
2-4. Fourth Technique
2-5. Fifth Technique
2-6. Sixth Technique 1. Basic Hologram Recording and Reproducing Operation FIG. 1 is a diagram illustrating an internal configuration of a hologram recording and reproducing apparatus employing a coaxial system. In FIG. 1, only a configuration of an optical system of the recording and reproducing apparatus is shown and the other configuration is omitted.

As described above, in the coaxial system, a signal beam and a reference beam are disposed in the same axis, data are recorded in an interference pattern by applying the signal beam and the reference beam to a hologram recording medium set at a predetermined position, and data recorded in the interference pattern are reproduced by applying the reference beam to the hologram recording medium at the time of performing a reproducing operation.

In FIG. 1, a configuration of a recording and reproducing apparatus corresponding to a reflecting hologram recording medium having a reflecting film as a hologram recording medium is shown.

First, a laser diode (LD) 1 is disposed as a light source providing a laser beam for recording and reproducing. A laser diode mounted with an external resonator is employed as the laser diode 1 and the wavelength of the laser beam is, for example, 410 nm.

A beam emitted from the laser diode 1 passes through a collimator lens 2 and then enters a spatial light modulator (SLM) 3.

The SLM 3 includes, for example, a transmissive liquid crystal panel and pixels thereof are controlled in accordance with a driving signal from a driving circuit not shown. The SLM modulates the light intensity of an incident beam in accordance with recording data. Specifically, the transmission of a beam can be controlled in the unit of pixel so that a pixel turned on by a driving signal transmits an incident beam and a pixel turned off does not transmit the incident beam. Data of "0" and "1" can be recorded in the unit of pixel, by means of the ON/OFF control of the SLM 3.

The beam modulated by the SLM 3 passes through a beam splitter 4, then passes through a relay lens optical system including a relay lens 5, a light-blocking mask 6, and a relay lens 7, passes through a quarter-wavelength plate 8, is concentrated by an objective lens 9, and then is applied to a hologram recording medium 10.

At the time of performing a recording operation, a signal beam modulated by the SLM 3 in accordance with the recording data and a reference beam having a ring shape as a concentric circle with the signal beam are generated as described later. That is, the signal beam and the reference beam generated in this way are concentrated on the hologram recording medium 10 through the above-mentioned path.

At the time of performing a reproducing operation, a beam from the laser diode 1 is incident on the SLM 3 through the collimator lens 2, similarly to the recording. The SLM 3 performs a reproducing spatial light intensity modulating operation on the incident beam to generate only a reference beam at the time of performing a reproducing operation. That is, at the time of performing a reproducing operation, the signal beam is not applied but only the reference beam is applied to the hologram recording medium 10.

With the application of the reference beam, a diffracted beam corresponding to the recording data on the hologram recording medium 10 as described later. The diffracted beam as a reflected beam from the hologram recording medium 10 passes through the objective lens 9 and is guided to the beam splitter 4 through the quarter-wavelength plate 8, the relay lens 7, the light-blocking mask 6, and the relay lens 5. The reflected beam from the hologram recording medium 10 guided through the above-mentioned path is reflected by the beam splitter 4 and the reflected beam is guided to an image sensor 11 as shown in the figure.

The image sensor 11 includes an image pickup device such as a CCD (Charge Coupled Device) sensor or a CMOS (Complementary Metal-Oxide Semiconductor) sensor and serves to receive the reflected beam (diffracted beam) from the hologram recording medium 10 guided as described above and to convert the received beam into an electrical signal.

FIGS. 2, 3A, and 3B are diagrams illustrating a basic hologram recording and reproducing operation performed by the above-mentioned optical system. FIG. 2 shows a recording operation and FIGS. 3A and 3B show a reproducing operation.

In FIG. 2, only the SLM 3 and the objective lens of the optical system shown in FIG. 1 are extracted and shown. Similarly, only the SLM 3 and the objective lens 9 are shown in FIG. 3A and only the objective lens 9 and the image sensor 11 are shown in FIG. 3B.

First, in the recording operation shown in FIG. 2, the SLM 3 modulates the intensity of the incident beam along with the reference beam on the basis of the recording data, so that the beam (called "signal beam") having a light intensity pattern based on a data pattern of "0" and "1" is arranged in a concentric circle.

The beams (that is, the reference beam and the signal beam) of which the intensity is modulated are concentrated on the hologram recording medium 10 by the objective lens 9 and an interference pattern of the reference beam and the signal beam formed as a result is recorded on the hologram recording medium 10.

In the reproducing operation, first as shown in FIG. 3A, the SLM 3 performs a spatial light intensity modulating operation on the incident beam to generate only a reference beam and concentrates the generated reference beam on the hologram recording medium 10. At this time, the concentrated beam is diffracted by the interference pattern corresponding to the data pattern recorded on the hologram recording medium 10 and is output as a reflected beam from the hologram recording medium 10. That is, the diffracted beam has a light intensity pattern containing the recording data as shown in the figure and reproduces the data on the basis of the detection result of the intensity pattern of the diffracted beam detected by the image sensor 11.

The SLM 3 generates the reference beam or the signal beam at the time of performing a recording operation/reproduction. Accordingly, in the SLM 3, a reference beam area A1, a signal beam area A2, and a gap area A3 shown in FIG. 4 are defined. That is, as shown in FIG. 4, a predetermined circular area including the center of the SLM 3 is defined as the signal beam area A2. The reference beam area A1 having a ring shape concentric with the signal beam area A2 is defined in the outer periphery thereof with the gap area A3 interposed therebetween.

The gap area A3 serves as an area for preventing the reference beam from leaking from the signal beam area A2 to act as noises.

At the time of performing a recording operation, predetermined pixels in the reference beam area A1 are set to "1" (light intensity=high), the other pixels therein are set to "0" (light intensity=low), all the pixels in the gap area A3 and outside the reference beam area A1 are set to "0", and the pixels in the signal beam area A2 are set to patterns of "0" and "1" corresponding to the recording data, thereby generating and outputting the reference beam and the signal beam sown in FIG. 2.

At the time of performing a reproducing operation, the pixels in the reference beam area A1 are set to the same pattern of "0" and "1" as those at the time of performing a recording operation and the pixels in the other areas are set to "0", thereby generating and outputting only the reference beam as shown in FIG. 3A.

2. Beam Applying Method 2-1. First Technique

In this embodiment, in consideration of the known problems, there is suggested a technique that can properly prevent a reflective hologram from being generated even when a recording operation is performed by rotationally driving a hologram recording medium. Now, a first technique thereof is described.

The first technique is to employ a hologram recording medium having a quarter-wavelength plate.

Figure 5:
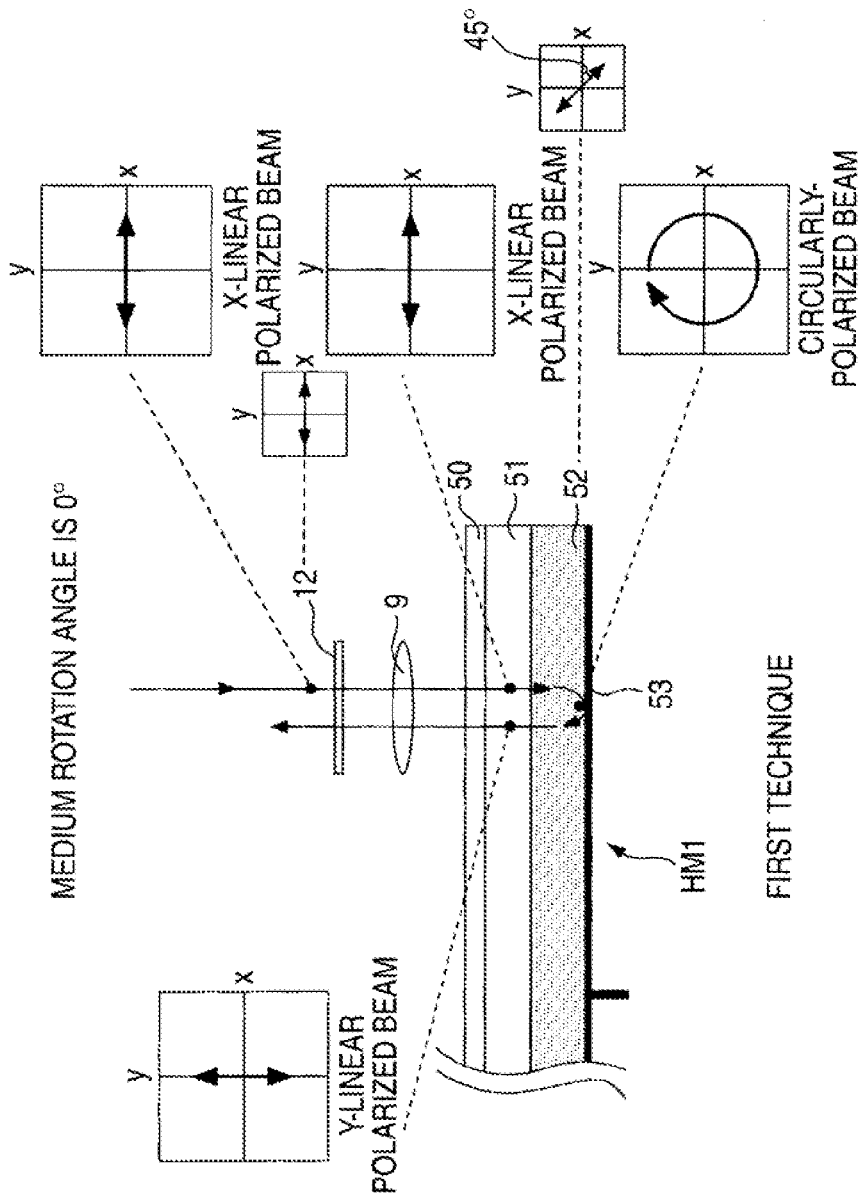
FIG. 5 is a diagram illustrating a first technique of a beam applying method according to an embodiment, where a medium rotation angle is 0°.
Figure 6:
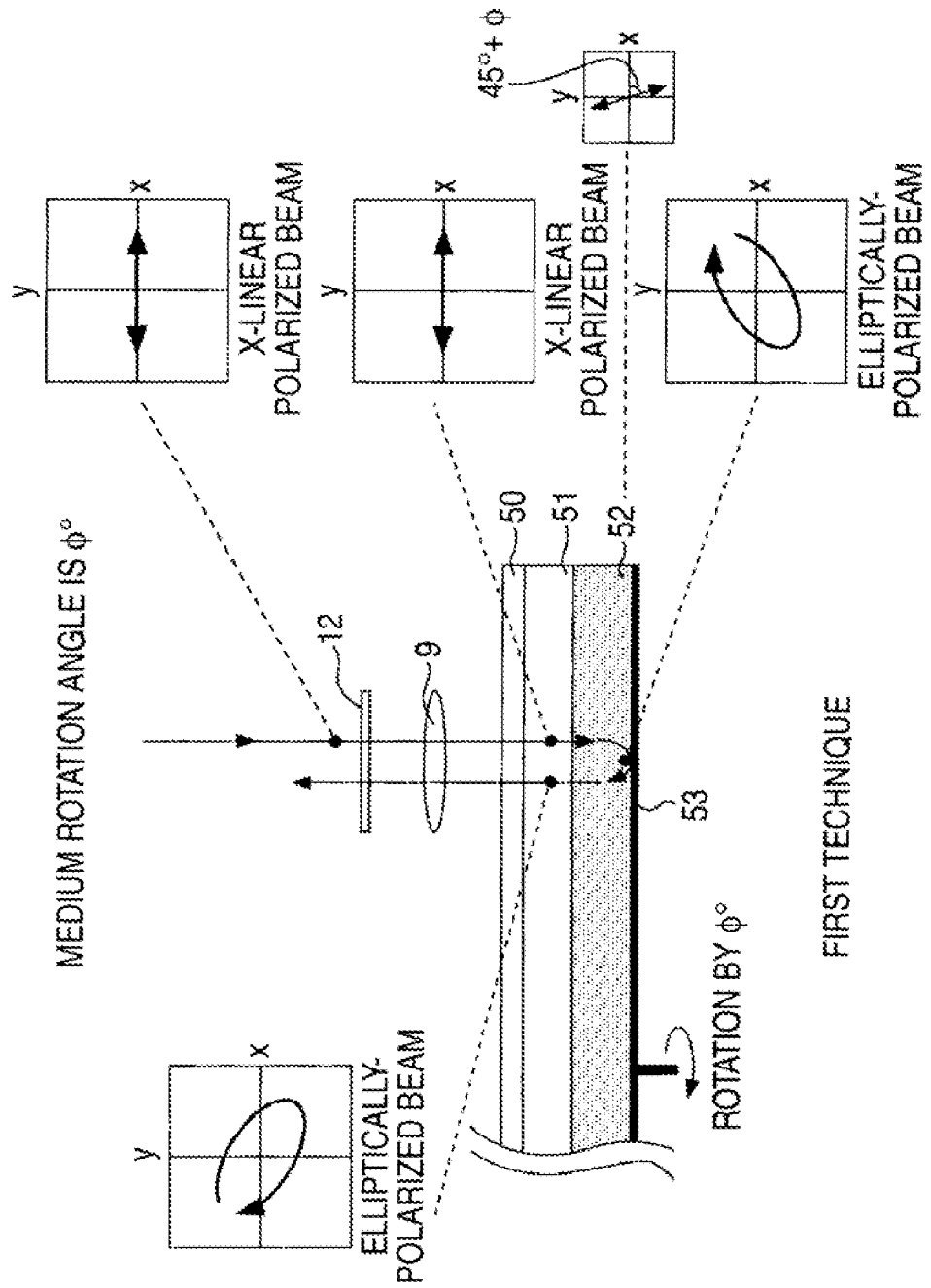
FIG. 6 is a diagram illustrating the first technique of the beam applying method according to an embodiment, where the medium rotation angle is $\phi°$.
Figure 7:
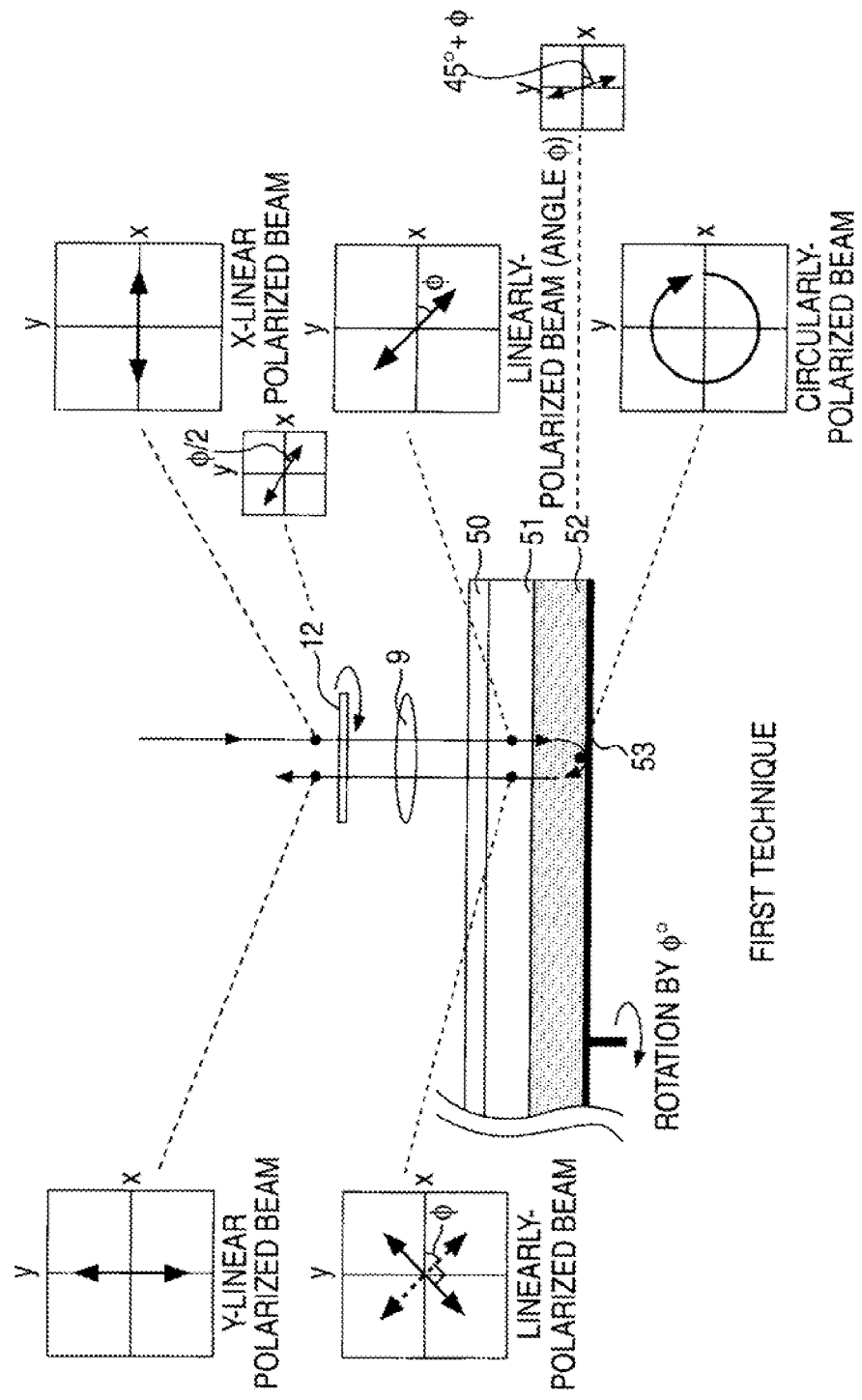
FIG. 7 is a diagram illustrating the first technique of the beam applying method according to an embodiment, where a half-wavelength plate disposed in the apparatus is rotationally driven with the rotation of the medium.

FIGS. 5 to 7 are diagrams illustrating the first technique of the beam applying method according to this embodiment, where a hologram recording medium HM 1 (sectional view) used in the first technique, an objective lens 9 disposed in the apparatus, a half-wavelength plate 12, and a beam applied to the hologram recording medium HM 1 through the half-wavelength plate 12 and the objective lens 9 are schematically shown.

First, a structure of the hologram recording medium HM 1 shown in the figures is described. The hologram recording medium HM 1 is a reflecting hologram recording medium having a reflecting film 53. A quarter-wavelength plate 52 is formed on the reflecting film 53 and a recording layer 51 on which a signal is recorded with an interference pattern of a reference beam and a signal beam is formed on the quarter-wavelength plate. A cover glass 50 configured to protect the recording layer 51 is formed on the recording layer 51.

A beam applying method as the first technique using the hologram recording medium HM 1 will be described with reference to FIGS. 5 to 7.

FIG. 5 shows a state where a medium rotation angle is 0°.

In FIG. 5, the polarization directions of a beam incident on the half-wavelength plate 12, a beam incident on the recording layer 51 in the hologram recording medium HM 1, a beam incident on the reflecting film 53 in the hologram recording medium HM 1, and a beam incident on the recording layer 51 from the reflecting film 53, an optical axis direction of the half-wavelength plate 12, and an optical axis direction of the quarter-wavelength plate 52 are shown with respect to an X axis and a Y axis perpendicular thereto.

Here, for example, an X-linear polarized beam of which the polarization direction is the X axis direction is incident on the half-wavelength plate 12 of the apparatus.

First, it is assumed that the optical axis direction of the half-wavelength plate 12 is parallel to the polarization direction of the incident beam when the medium rotation angle is 0° as shown in FIG. 5. That is, the optical axis direction of the half-wavelength plate 12 is parallel to the X axis direction as shown in the figure. Accordingly, when the medium rotation angle is 0°, a beam having a polarization direction (X axis direction in this case) parallel to the polarization direction of the beam incident on the half-wavelength plate 12 is incident on the recording layer 51 of the hologram recording medium HM 1.

In the hologram recording medium HM 1, the optical axis direction of the quarter-wavelength plate 52 is set to run off by 45° from the optical axis direction of the half-wavelength plate 12 of the apparatus as shown in the figure, when the medium rotation angle is 0°. In other words, the optical axis direction of the quarter-wavelength plate 52 is set to run off by 45° from the polarization direction of the incident X-linear polarized beam through the recording layer 51.

Since the polarization direction of the incident beam on the half-wavelength plate 12, the optical axis direction of the half-wavelength plate 12, and the optical axis direction of the quarter-wavelength plate 52 are set as described above, the X-linear polarized beam incident on the quarter-wavelength plate 52 through the recording layer 51 in the hologram recording medium HM 1 is converted into a right-rotated circularly-polarized beam by the quarter-wavelength plate 52 in the state where the medium rotation angle is 0° as shown in FIG. 5. The beam converted into the right-rotated circularly-polarized beam is reflected by the reflecting film 53 located below the quarter-wavelength plate 52 and is incident again on the quarter-wavelength plate 52.

The right-rotated circularly-polarized beam incident on the quarter-wavelength plate 52 from the reflecting film 53 is converted into a Y-linear polarized beam by the quarter-wavelength plate 52. The Y-linear polarized beam passes through the recording layer 51 and the cover glass 50 and then is incident on the objective lens 9 as a reflected beam toward the apparatus.

In this way, in the state where the medium rotation angle is 0°, the polarization direction of the incident beam to the half-wavelength plate 12, the optical axis direction of the half-wavelength plate 12, and the optical axis direction of the quarter-wavelength plate 52 are set as described above. Accordingly, the polarization direction of a forward beam (X-linear polarized beam in this case) incident on the recording layer 51 from the apparatus can be made to be perpendicular to the polarization direction of the forward beam (Y-linear polarized beam in this case) passing through the recording layer 51, being reflected by the reflecting film 53, and being returned to the apparatus.

That is, since the polarization directions of the forward beam and the backward beam can be made to be perpendicular to each other, it is possible to prevent the reflective hologram in pattern B and pattern C from being generated, thereby preventing the reflective hologram from being recorded at the time of performing a recording operation.

As can be understood from the above description, when the hologram recording medium HM 1 is rotationally driven from the above-mentioned state, the angle formed by the polarization direction incident on the quarter-wavelength plate 52 through the recording layer 51 and the optical axis direction of the quarter-wavelength plate 52 varies, thereby not maintaining the state where the polarization direction of the forward beam and the polarization direction of the backward beam are perpendicular to each other.

FIG. 6 shows a state where the hologram recording medium HM 1 is rotated by $\phi°$ from the state where the medium rotation angle 0° in FIG. 5. In this case, as shown in the figure, only the optical axis direction of the quarter-wavelength plate 52 is changed from 45° shown in FIG. 5 to 45°+$\phi$. Accordingly, the beam reaching the reflecting film 53 through the quarter-wavelength plate 52 is not converted into a proper circularly-polarized beam unlike the example shown in FIG. 5, but into a right-rotated elliptically-polarized beam as shown in the figure. As a result, the right-rotated elliptically-polarized beam reflected by the reflecting film 53 and input again to the quarter-wavelength plate 52 is converted into a left-rotated elliptically-polarized beam and the left-rotated elliptically-polarized beam is output as a reflected beam toward the apparatus through the recording layer 51 and the cover glass 50.

In this case, since the polarization direction of the forward beam is parallel to that of the X-linear polarized beam but the polarization direction of the backward beam is parallel to that of the elliptically-polarized beam, it is not possible to properly prevent the forward beam and the backward beam from interfering with each other, thereby not preventing the reflective hologram from being generated.

Therefore, in the first technique, as shown in FIG. 7, the half-wavelength plate 12 disposed in the apparatus is rotationally driven with the rotation of the hologram recording medium HM 1.

That is, as shown in the figure, the half-wavelength plate 12 is rotated by $\phi/2$ when the hologram recording medium HM 1 is rotated by $\phi°$. In this way, when it is assumed that the rotation angle of the half-wavelength plate 12 is $\theta$ and the rotation angle of the hologram recording medium HM 1 is $\phi$, the half-wavelength plate 12 is rotationally driven so as to satisfy a relation of "$\theta=\phi/2$."

As known widely, the half-wavelength plate has a characteristic of changing the polarization direction of a linearly-polarized beam, the polarization direction of which forms an angle of $\alpha$ with the optical axis direction, by $2\alpha$.

Accordingly, as described above, by rotationally driving the half-wavelength plate 12 so as to maintain the relation of "$\theta=\phi/2$", the polarization direction of the forward beam incident on the recording layer 51 and the quarter-wavelength plate 52 of the hologram recording medium HM 1 through the half-wavelength plate 12 and the objective lens 9 can be always set to $\phi$ with the rotation of the hologram recording medium HM 1 by $\phi$.

Accordingly, as shown in the figure, the angle formed by the optical axis direction of the quarter-wavelength plate 52 and the polarization direction of the beam incident on the quarter-wavelength plate 52 can be always maintained at 45° ($\phi+45°-\phi=45°$). When the angle formed by the optical axis direction of the quarter-wavelength plate 52 and the polarization direction of the beam incident on the quarter-wavelength plate 52 is maintained at 45°, similarly to the example shown in FIG. 5, the polarization direction of the beam incident on the quarter-wavelength plate 52 can be made to be perpendicular to the polarization direction of the beam reflected by the reflecting film 53 and output through the quarter-wavelength plate 52 again. That is, when the hologram recording medium HM 1 is rotationally driven, the polarization directions of the forward beam and the backward beam can be kept perpendicular to each other.

According to the beam applying method as the first technique, when the hologram recording medium HM 1 is rotationally driven, the polarization directions of the forward beam and the backward beam can be kept perpendicular to each other. Accordingly, even when the hologram recording medium HM 1 is rotationally driven, it is possible to prevent the reflective hologram from being generated. As a result, it is possible to prevent the reflective hologram from being recorded, thereby preventing the deterioration in SNR.

As can be understood from the above description, it is required for implementing the first technique to rotationally drive the half-wavelength plate 12 with the rotation of the hologram recording medium HM 1.

In a specific example, rotation angle information recorded in the hologram recording medium HM 1 is used. That is, although not shown in FIGS. 5 to 7, the hologram recording medium may include a particular recording layer, in which information readable by applying a laser beam having a wavelength different from that of the laser beam used to record and reproduce a hologram is recorded, below the reflecting film 53. Here, a configurational example in which the rotation of the half-wavelength plate 12 is controlled to maintain the above-mentioned relation "$\theta=\phi/2$" by the use of the rotation angle information recorded in the particular recording layer will be described.

Figure 8:
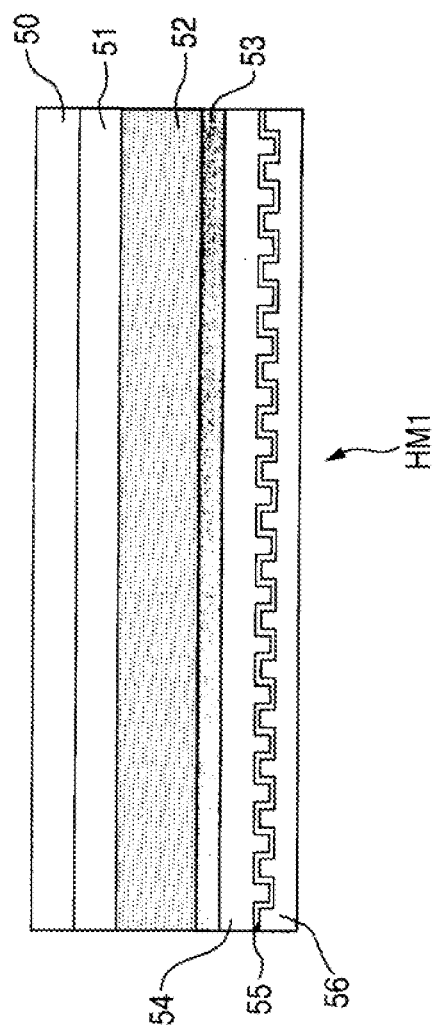
FIG. 8 is a diagram illustrating a sectional structure of a hologram recording medium used in the first technique.

FIG. 8 shows a sectional structure of the hologram recording medium HM 1 having the particular recording layer. In the figure, the elements described with reference to FIG. 5 are denoted by the same reference numerals and description thereof is omitted.

As shown in FIG. 8, the cover glass 50, the recording layer 51, and the quarter-wavelength plate 52 are sequentially formed from the uppermost in the hologram recording medium HM 1. In this case, a reflecting film having wavelength selectivity is selected as the reflecting film 53 disposed below the quarter-wavelength plate 52. Specifically, the reflecting film is configured to have the wavelength selectivity of reflecting a laser beam having a wavelength of 410 nm used to record and reproduce a hologram and transmitting a laser beam having a wavelength of 650 nm used to read information recorded on a substrate 56 to be described later.

Below the reflecting film 53, an intermediate layer 54, a reflecting film 55, and a substrate 56 are formed as shown in the figure.

In this case, the substrate 56 is a resin substrate made of, for example, polycarbonate and has a pitted surface, in which information is recorded by an uneven sectional shape (combination of pits and lands), formed on the surface thereof. That is, information such as the rotation angle information is recorded on the pitted surface.

For example, the reflecting film 55 is formed on the pitted surface of the substrate 56. By bonding the substrate 56 having the reflecting film 55 formed thereon to the bottom of the reflecting film 53 by the use of an adhesive material such as resin as the intermediate layer 54, the hologram recording medium HM 1 shown in FIG. 8 is formed.

For the purpose of confirmation, it is described that the "rotation angle information" means information on rotation angle values written for the rotation angles of the disc-like hologram recording medium HM 1. That is, by reading the rotation angle information, it is possible to identify the medium rotation angle at a sight.

It should be noted that the quarter-wavelength plate 52 of the hologram recording medium HM 1 is formed so that the angle of the optical axis direction about an axis direction in which the rotation angle defined by the recorded rotation angle information is 0° is 45°. That is, by forming the quarter-wavelength plate 52 in the hologram recording medium HM 1, it is guaranteed that the optical axis direction of the quarter-wavelength plate 12 about the axis direction in which the rotation angle is 0° runs off by 45° when the rotation angle of the hologram recording medium HM 1 is 0° (that is, when 0° is read as the rotation angle information).

Figure 9:
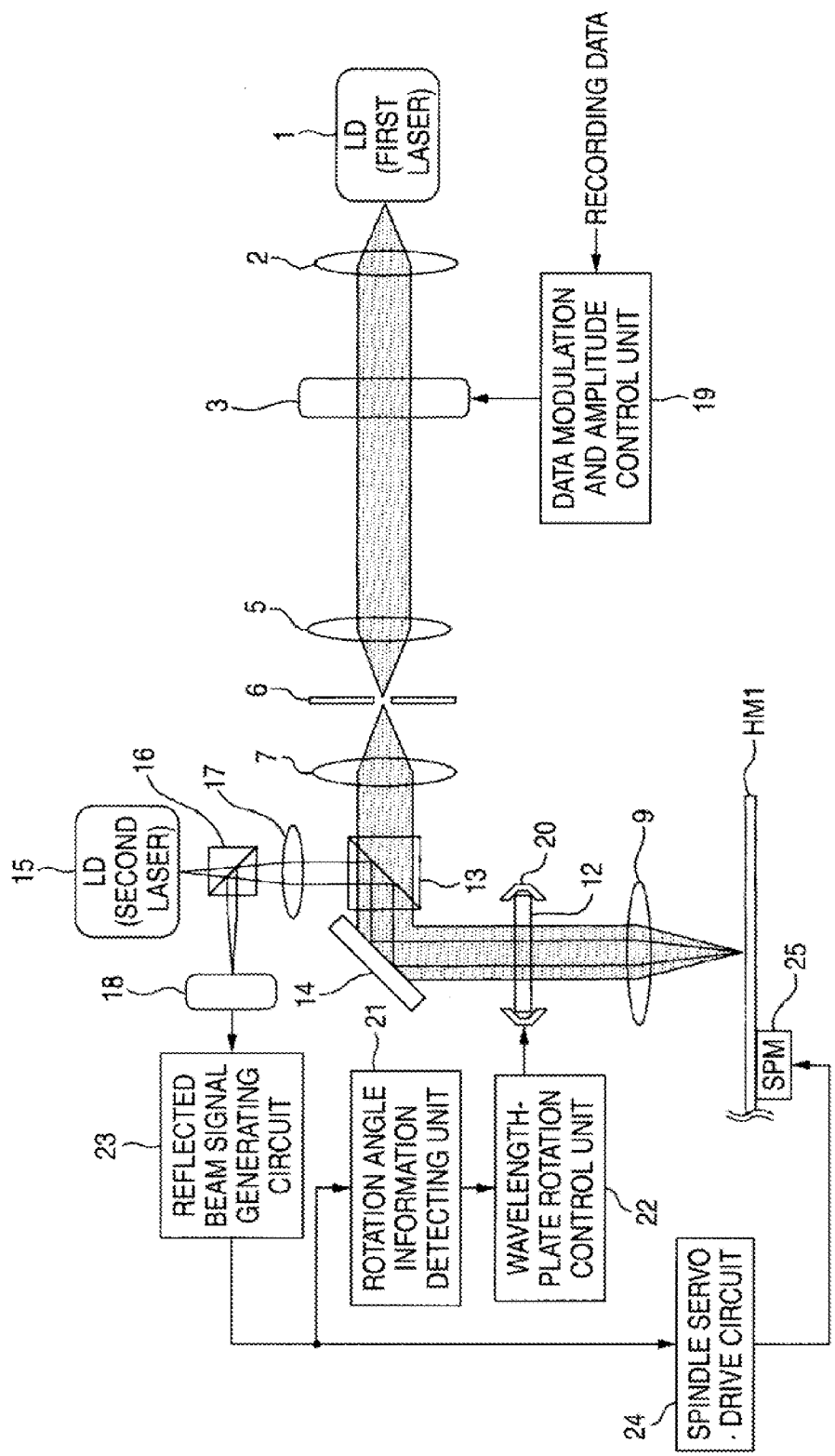
FIG. 9 is a diagram illustrating an internal configuration of a beam applying apparatus for embodying the first technique.

FIG. 9 shows an internal configuration of a beam applying apparatus according to an embodiment for implementing the first technique so as to cope with the hologram recording medium HM 1 shown in FIG. 8.

As the beam applying apparatus according to the embodiment, a configuration of a recording apparatus that can perform only a recording operation on the hologram recording medium HM 1 is shown in FIG. 9. In FIG. 9, the elements described with reference to FIG. 1 are denoted by the same reference numerals and description thereof is omitted.

In the beam applying apparatus shown in FIG. 9, the laser diode 1, the collimator lens 2, the SLM 3, the relay lens 5, the light-blocking mask 6, and the relay lens 7, which have been described with reference to FIG. 1, are disposed. However, since the beam applying apparatus shown in FIG. 9 is a recording apparatus, the image sensor 11 shown in FIG. 1 and the beam splitter 4 guiding the reflected beam from the medium to the image sensor 11 are omitted.

In this case, as described later, since a second laser 15 applying a laser beam having a different wavelength is disposed, the above-mentioned laser diode 1 is referred to as a first laser 1 for the purpose of discrimination thereof.

In this case, a beam emitted from the first laser 1 and output from the relay lens 7 passes through the dichroic mirror 13, is reflected by the mirror 14 to fold back the optical axis by 90°, and is incident on the half-wavelength plate 12 shown in FIGS. 5 to 7. The beam passing through the half-wavelength plate 12 is applied to the hologram recording medium HM 1 set at a predetermined position through the objective lens 9.

Here, the beam applying apparatus is provided with a data modulation and amplitude control unit 19 as a configuration for executing a light intensity modulating operation of the SLM 3 in accordance with the recording data described with reference to FIG. 2.

The recording data to be recorded on the hologram recording medium HM 1 is input to the data modulation and amplitude control unit 19. The data modulation and amplitude control unit 19 serves to control the light intensity modulating operation (particularly, a light intensity modulating operation in the signal beam area A2) of the SLM 3 in accordance with the recording data.

Specifically, a record modulation and encoding process in accordance with a predetermined recording format is performed on the input recording data. For example, a record modulation and encoding process of converting 1 byte (=8 bits) of recording data into a square block-like data arrangement of 4×4=16 bits is known as a known sparse encoding process in a hologram recording and reproducing system.

The block-like data arrangement obtained by the encoding process is arranged in a sheet of hologram page based on a recording format (which is called "mapping"). The hologram page means the entire data arrangement filled in the signal beam area A2. That is, the hologram page is a data unit which can be recorded at a time by the interference between the signal beam and the reference beam.

In this way, by mapping the recording data, a data pattern of "0" and "1" in the signal beam area A2 is obtained.

The data modulation and amplitude control unit 19 acquires the data pattern in the signal beam area A2 and generates a data pattern in which predetermined pixels in the reference beam area A1 are set to "1", the other pixels are set to "0", and all the pixels in the gap area A3 and outside the reference beam area A1 are set to "0." A data pattern corresponding to the entire effective pixels of the SLM 3 is generated thereon from the generated data pattern and the data pattern in the signal beam area A2.

At the time of performing a recording operation, the data modulation and amplitude control unit 19 sequentially acquires the data pattern corresponding to the entire effective pixels of the SLM 3 from the input recording data and controls the driving of the pixels of the SLM 3 on the basis of the data pattern. Accordingly, a reference beam corresponding to a predetermined ON/OFF pattern and a signal beam of which the ON/OFF pattern varies depending on the details of the recording data are output from the SLM 3 at the time of performing a recording operation.

In the beam applying apparatus shown in the figure, as shown in FIG. 8, the second laser 15, the beam splitter 16, the collimator lens 17, the dichroic mirror 13, the photo detector 18, and the reflected beam signal generating circuit 23 are disposed as a configuration for reading information recorded on the pitted surface formed in the substrate 56 of the hologram recording medium HM 1.

The second laser 15 emits a laser beam having a wavelength (for example, 650 nm) different from the wavelength (for example, 410 nm) of the first laser 1. The beam emitted from the second laser 15 passes through the beam splitter 16 and then enters the dichroic mirror 13 through the collimator lens 17.

An incident beam of which the light source is the second laser 15 is reflected by the dichroic mirror 13 and the reflected beam is guided to the mirror 14 as shown in the figure. The optical path after the mirror 14 is the same as the beam of which the light source is the first laser 1. That is, the beam of which the light source is the second laser 15 is applied to the hologram recording medium HM 1 through the half-wavelength plate 12 and the objective lens 9.

The beam of which the light source is the second laser 15 and which has been applied to the hologram recording medium HM 1 is reflected by the reflecting film 56 formed on the pitted surface of the hologram recording medium HM 1. The reflected beam passes through the objective lens 9, the half-wavelength plate 12, and the mirror 14, is then reflected by the dichroic mirror 13, and then is incident on the beam splitter 16 through the collimator lens 17. As shown in the figure, the beam incident on the beam splitter 16 from the collimator lens 17 is reflected by the beam splitter 16 and is guided to the photo detector 18.

The photo detector 18 receives the reflected beam input through the above-mentioned path and acquired from the reflecting film 56 on the pitted surface, converts the received beam into an electrical signal, and supplies the electrical signal to the reflected beam signal generating circuit 23. In this case, divisional detectors used in the field of an optical disk are employed as the photo detector 18. The reflected beam signal generating circuit 23 is supplied with detection signals from plural, for example, 4, detectors.

The reflected beam signal generating circuit 23 generates a reflected beam signal such as an RF signal or a signal for a variety of servo (for example, a tracking error signal or a focus error signal) on the basis of the electrical signal from the photo detector 18.

Although not shown in the figure, the reflected beam signal for a variety of servo generated from the reflected beam signal generating circuit 23 are supplied to a servo-based circuit not shown and positions in the tracking direction and the focus direction of the objective lens 9 are controlled accordingly, thereby implementing a variety of servo control.

In the beam applying apparatus, a spindle motor (SPM) 25 and a spindle servo drive circuit 24 are provided as a configuration for driving the hologram recording medium HM 1. The spindle motor 25 rotationally drives the hologram recording medium HM 1 set at a predetermined position. The spindle servo drive circuit 24 controls the rotational drive of the spindle motor 25, for example, by the use of a predetermined rotation control method such as a CLV.

In this case, the spindle servo drive circuit 24 receives an RF signal (a reading signal for reading a signal recorded on the substrate 56 of the hologram recording medium HM 1) generated from the reflected beam signal generating circuit 23, performs a PLL process to generate a reproduction clock, and acquires the reproduction clock as rotation speed information of the spindle motor 25. The spindle servo control circuit controls the rotation of the spindle motor 25 on the basis of the rotation speed information, so that the hologram recording medium HM 1 is rotationally driven by the use of the predetermined rotational driving method.

In the beam applying apparatus, a rotational driving unit 20, a rotation angle information detecting unit 21, and a wavelength plate rotation control unit 22 are provided as a configuration for rotationally driving the half-wavelength plate 12.

First, the rotational driving unit 20 is configured to hold the half-wavelength plate 12 with the half-wavelength plate 12 interposed between the mirror 14 and the objective lens 9 in the optical path and to rotationally drive the held half-wavelength plate 12. Specifically, since the rotational driving unit 20 includes a motor and is configured to supply the rotational driving force of the motor to the half-wavelength plate 12, it can rotationally drive the half-wavelength plate 12.

The rotation angle information detecting unit 21 detects the rotation angle information from the hologram recording medium HM 1 on the basis of the reflected beam signal generating circuit 23. Specifically, the rotation angle information detecting unit detects the rotation angle information on the basis of the RF signal supplied from the reflected beam signal generating circuit 23.

The wavelength plate rotation control unit 22 controls the half-wavelength plate 12 to rotate with the rotation of the hologram recording medium HM 1, by controlling the rotation of the motor of the rotational driving unit 20 on the basis of the rotation angle information supplied from the rotation angle information detecting unit 21. Specifically, when it is assumed that the rotation angle of the half-wavelength plate 12 is $\theta$ and the rotation angle of the hologram recording medium HM 1 is $\phi$, the wavelength plate rotation control unit controls the rotation of the motor of the rotational driving unit 20 so as to maintain the relation of "$\theta = \phi/2$".

In the first technique, as described with reference to FIGS. 5 and 7, when the rotation angle of the hologram recording medium HM 1 is 0°, it is assumed that the optical axis direction of the half-wavelength plate 12 is parallel to the polarization direction of the beam incident on the half-wavelength plate 12.

Accordingly, in order to establish the first technique, it is necessary that the optical axis direction of the half-wavelength plate 12 is parallel to the polarization direction of the beam incident on the half-wavelength plate 12 in the state where the rotation angle of the half-wavelength plate 12 is 0° which serves as a reference of the wavelength plate rotation control unit 22. That is, a relation between the rotation angle (rotation angle of the motor of the rotational driving unit 20) of the half-wavelength plate 12 recognized by the wavelength plate rotation control unit 22 and an attachment angle of the half-wavelength plate 12 to the rotation driving unit 20 is adjusted so that the optical axis direction of the half-wavelength plate 12 is parallel to the polarization direction of the beam incident on the half-wavelength plate 12 in the state, recognized by the wavelength plate rotation control unit 22, that the rotation angle of the half-wavelength plate 12 is 0°.

By trying the adjustment, the polarization direction of the beam incident on the hologram recording medium HM 1 can be correctly rotated between 0° and $\phi$° with the rotation of the hologram recording medium HM 1 between 0° and $\phi$°, as described with reference to FIGS. 5 and 7.

According to the above-mentioned configuration of the beam applying apparatus shown in FIG. 9, it is possible to rotationally drive the half-wavelength plate 12 with the rotation of the hologram recording medium HM 1 as described with reference to FIGS. 5 and 7. As a result, it is possible to provide a beam applying apparatus that can prevent a reflective hologram from being generated.

Although it has been assumed above that the first technique according to this embodiment is applied to only recording data on the hologram recording medium HM 1, the first technique may be suitably applied to reproducing data from the hologram recording medium HM 1.

At the time of reproducing data from the hologram recording medium HM 1, plural holograms are formed with the interference of the forward beam and the backward beam, similarly to the above-mentioned recording operation. That is, in the reproducing operation, the reference beam and the reproducing beam interfere with each other to generate:

Pattern E; signal beam (forward path)×reference beam (forward path) =transmissive hologram Pattern F; signal beam (forward path)×reference beam (backward path)=reflective hologram Pattern G; signal beam (backward path)×reference beam (forward path)=reflective hologram Pattern H; signal beam (backward path)×reference beam (backward path)=transmissive hologram At the time of performing a recording operation, the signal beam and the reference beam interfere with each other with the same intensity (for example, 1:1) to record a hologram (diffraction grating), in general. At the time of performing a reproducing operation, the reference beam and the reproducing beam acquired with the application of the reference beam have an intensity difference (that is, diffraction efficiency) of about $1.0 \times 10^{-3}$ (1/1000), which is very small in comparison with the intensity ratio of the reference beam and the signal beam in the recording operation. Accordingly, it is considered that the interference of the reference beam and the reproduced beam in the reproducing operation does not form a diffraction grating directly affecting a hologram image.

However, the lamination of minute diffraction gratings resulting from the interference of the reference beam and the reproduced beam may serve indirectly as a noise source in the reproducing operation. As a result, the plural holograms formed in the reproducing operation may cause deterioration in SNR.

As can be understood from the description with reference to FIGS. 5 and 7, according to the first technique, of course, the polarization direction of the forward beam and the polarization direction of the backward beam can be made to be perpendicular to each other in the reproducing operation. That is, since the polarization directions of the forward beam and the backward beam can be made to be perpendicular to each other in the reproducing operation, it is possible to prevent the reflective holograms of pattern F and pattern G from being generated. Since the reflective hologram can be prevented in the reproducing operation, it is possible to improve the SNR.

In a specific example where the first technique is applied to a reproducing apparatus that can perform only a reproducing operation, a beam splitter may be added between the SLM 3 and the relay lens 5, as shown in FIG. 1, in the configuration shown in FIG. 9, so that the beam splitter 4 reflects the reflected beam from the hologram recording medium HM 1 and guides the reflected beam to the image sensor 11. In this case, the data modulation and amplitude control unit 19 does not perform the above-mentioned operation at the time of performing a recording operation, but generates a data pattern in which only the reference beam area A1 is set to a predetermined pattern of "0" and "1" and the other area is set to "0" bits and controls the driving of the pixels of the SLM 3 on the basis of the data pattern. That is, only the reference beam is output from the SLM 3.

Alternatively, the first technique can be applied to a recording and reproducing apparatus. In this case, regarding the configuration of the optical system, the beam splitter 4 and the image sensor 11 are added to the configuration shown in FIG. 9, similarly to the reproducing apparatus. The data modulation and amplitude control unit 19 is configured to generate the above-mentioned data pattern at the time of performing a recording operation and to control the driving of the pixels of the SLM 3 on the basis of the data pattern at the time of performing a recording operation, and is configured to generate the above-mentioned data pattern at the time of performing a reproducing operation and to control the driving of the pixels of the SLM 3 on the basis of the data pattern.

When the first technique is applied to the reproducing apparatus and the recording and reproducing apparatus, a polarized beam splitter can be used as the beam splitter 4. That is, as described above, according to the first technique, the polarization directions of the forward beam and the backward beam can be made to be perpendicular to each other. Accordingly, a polarized beam splitter transmitting the forward beam (for example, X-linear polarized beam) and reflecting the backward beam (for example, Y-linear polarized beam) can be used.

2-2. Second Technique

A second technique of the beam applying method according to the embodiment will be described now.

The second technique employs a hologram recording medium HM 2 in which an absorbing linear polarization element 57 instead of the quarter-wavelength plate 52 in the first technique is used as the polarization element formed in the hologram recording medium HM.

Figure 10:
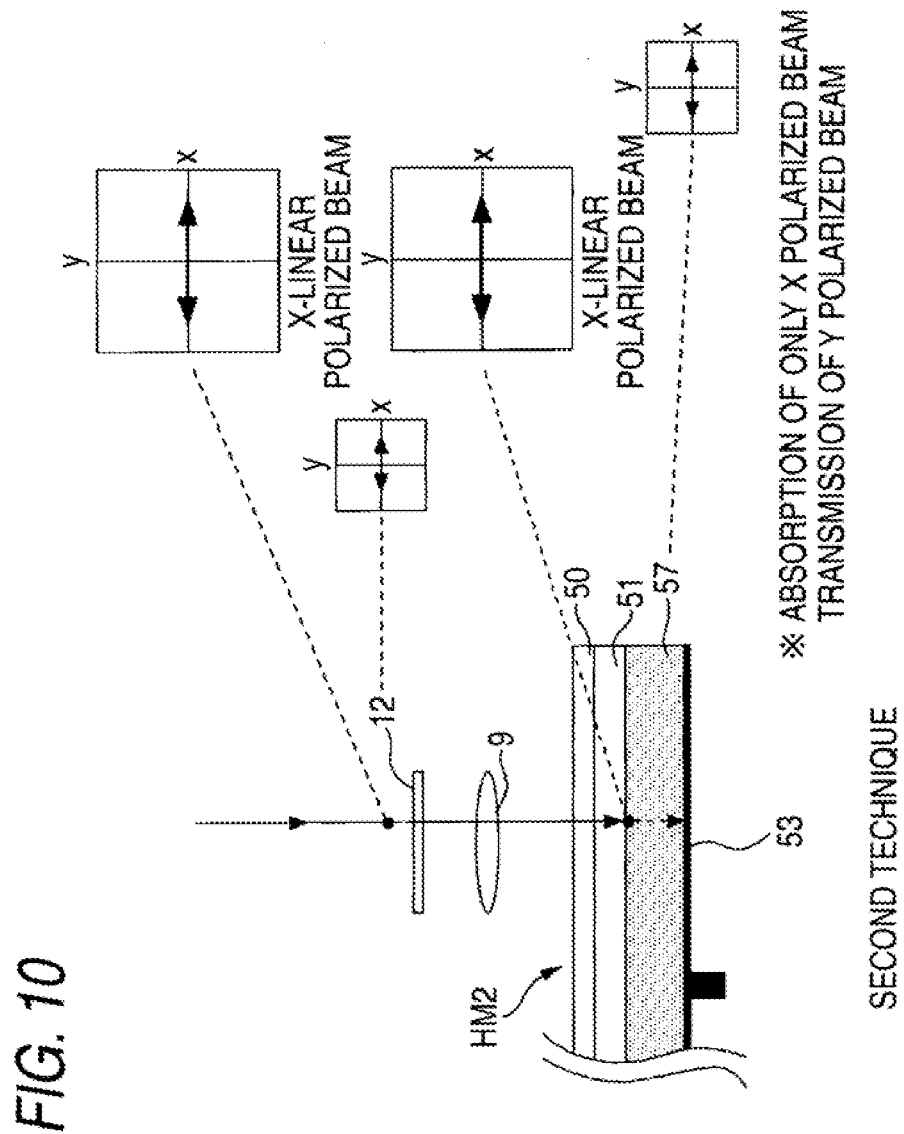
FIG. 10 is a diagram illustrating a second technique of the beam applying method according to an embodiment, where the medium rotation angle is 0°.
Figure 11:
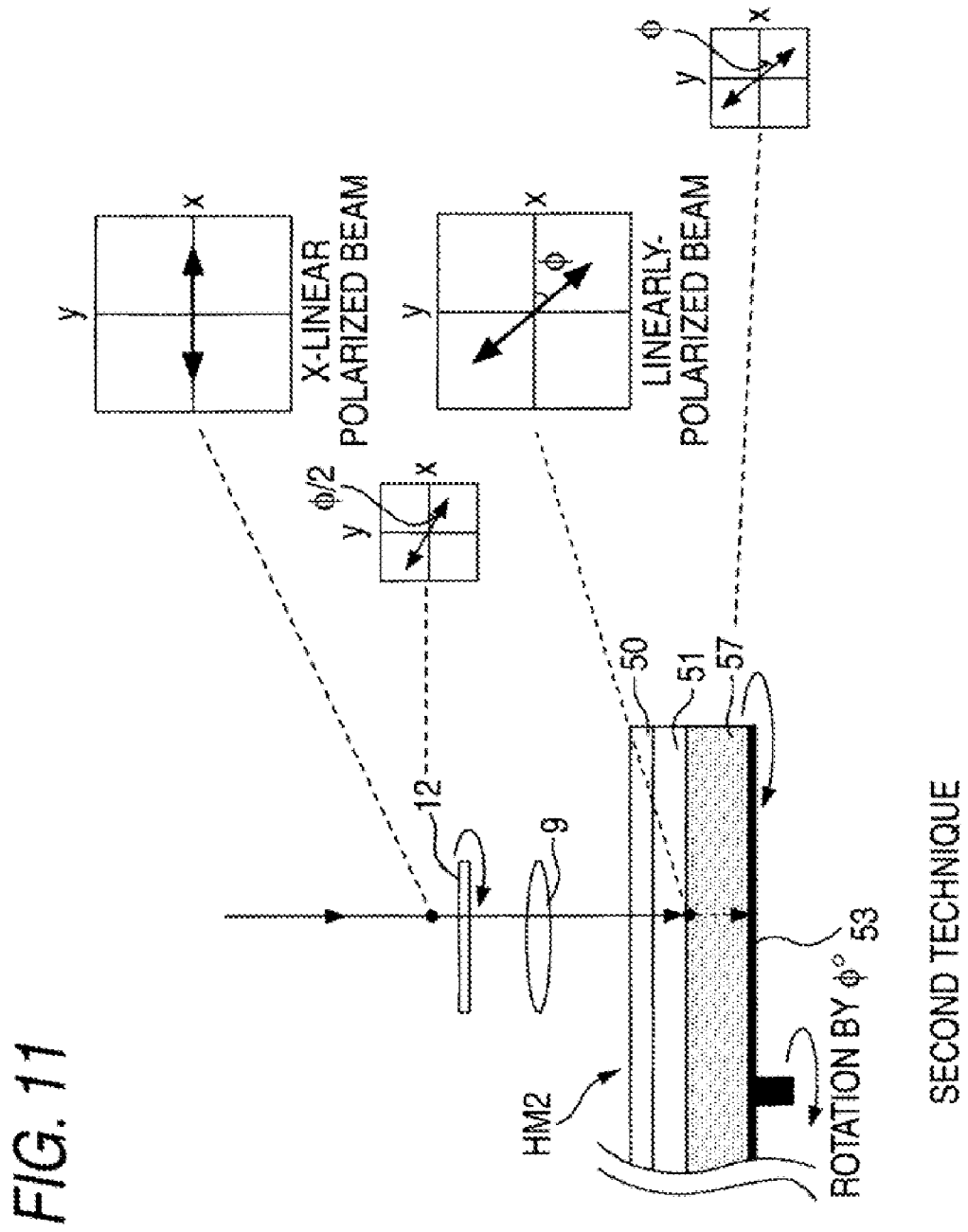
FIG. 11 is a diagram illustrating the second technique of the beam applying method according to an embodiment, where the medium rotation angle is $\phi°$.

FIGS. 10 and 11 are diagram illustrating the second technique, where FIG. 10 shows the state that the medium rotation angle is 0° and FIG. 11 shows the state that the medium rotation angle is φ°.

In FIGS. 10 and 11, similarly to FIGS. 5 to 7, the polarization directions of a beam incident on the half-wavelength plate 12 of the apparatus, a beam incident on the recording layer 51 in the hologram recording medium HM 2, a beam incident on the reflecting film 53 in the hologram recording medium HM 2, and a beam incident on the recording layer 51 from the reflecting film 53 and the optical axis direction of the half-wavelength plate 12 are shown with respect to an X axis and a Y axis perpendicular thereto. The polarization axis direction of the absorbing linear polarization element 57 disposed in the hologram recording medium HM 2 is also shown therein.

In this case, the X-linear polarized beam is incident on the half-wavelength plate 12 of the apparatus as shown in the figure. It is true of third, fifth, and sixth techniques described later that the X-linear polarized beam is incident on the wavelength plate disposed in the apparatus.

As shown in FIGS. 10 and 11, in the hologram recording medium HM 2, the cover glass 50, the recording layer 51, the absorbing linear polarization element 57, and the reflecting film 53 are sequentially formed from the uppermost.

The absorbing linear polarization element 57 means a polarization element configured to absorb the incident beam having a polarization direction parallel to the polarization axis direction thereof and to transmit the incident beam having a polarization direction perpendicular to the polarization axis direction thereof. For example, a polarizing plate can be used as the absorbing linear polarization element 57.

In the second technique, when the medium rotation angle is 0° as shown in FIG. 10, the optical axis direction of the half-wavelength plate 12 is parallel to the polarization direction of an incident beam. Specifically, since the X-linear polarized beam is incident on the half-wavelength plate 12, the optical axis direction of the half-wavelength plate 12 is parallel to the X axis direction.

Therefore, when the medium rotation angle is 0°, the X-linear polarized beam is applied to the hologram recording medium HM 2 without any change.

In the hologram recording medium HM 2, when the rotation angle is 0°, the polarization axis direction of the absorbing linear polarization element 57 is parallel to the X axis direction as shown in the figure. That is, when the rotation angle is 0°, the absorbing linear polarization element 57 is formed in the hologram recording medium HM 2 so that the polarization axis direction thereof is parallel to the polarization direction of the incident beam.

The optical axis direction of the half-wavelength plate 12 and the polarization axis direction of the absorbing linear polarization element 57 are set as described above. Accordingly, when the medium rotation angle is 0°, the X-linear polarized beam is applied to the hologram recording medium HM 2 from the apparatus and the applied X-linear polarized beam is incident on the absorbing linear polarization element 57 of which the polarization axis direction is parallel to the X axis direction through the recording layer 51. As described above, since the absorbing linear polarization element 57 absorbs the incident beam of which the polarization direction is parallel to the polarization axis direction thereof, the X-linear polarized beam (forward beam) incident on the absorbing linear polarization element 57 is absorbed by the absorbing linear polarization element 57. That is, in the second technique, the reflected beam (that is, the backward beam) from the reflecting film 53 is not generated.

In this case, since the backward beam is not generated, it is possible to prevent the reflective hologram from being generated.

The state where the medium rotation angle is ϕ is shown in FIG. 11. Similarly to the first technique, when it is assumed that the rotation angle of the half-wavelength plate 12 is θ and the rotation angle of the hologram recording medium HM 2 is ϕ, the half-wavelength plate 12 can be rotationally driven to maintain the relation of "θ=ϕ/2".

In this way, by rotationally driving the half-wavelength plate 12, the polarization direction of the beam incident on the absorbing linear polarization element 57 can be changed by ϕ with respect to the polarization axis of the absorbing linear polarization element 57 rotated by ϕ°with the rotation of the medium by ϕ°, thereby making the axis directions parallel to each other. Accordingly, even when the hologram recording medium HM 2 is rotationally driven, the incident beam can be absorbed by the absorbing linear polarization element 57. As a result, even when the hologram recording medium HM 2 is rotationally driven, it is possible to prevent the backward beam form being generated, thereby preventing the reflective hologram from being generated and recorded.

According to the second technique, as described above, it is possible to prevent the backward beam from being generated. Accordingly, it is possible to prevent the reflective hologram from being generated and to prevent one of two kinds of transmissive holograms from being generated. That is, when the backward beam is prevented from being generated, it is possible to prevent the transmissive hologram due to "reference beam (backward path)×signal beam (backward path)" of pattern D shown in FIG. 21B from being generated. In this case, it is possible to record only one kind of transmissive hologram due to "reference beam (forward path)×signal beam (forward path)" of pattern A shown in FIG. 20A.

Since it is possible to prevent the reflective hologram from being recorded and to record only one of two kinds of transmissive holograms, it is possible to improve the SNR.

In the second technique, it is necessary to rotationally drive the half-wavelength plate 12 with the rotation of the hologram recording medium HM. For the purpose of performing the rotational driving, a technique using the rotation angle information recorded on the hologram recording medium HM may be employed, similarly to the first technique.

In the structure of the hologram recording medium HM 2 on which the rotation angle information is recorded, the quarter-wavelength plate 52 in the hologram recording medium HM 1 shown in FIG. 8 is replaced with the absorbing linear polarization element 57.

However, as can be understood from the description with reference to FIG. 10, in the second technique, it is necessary that the polarization axis direction of the absorbing linear polarization element 57 is parallel to the X axis direction when the medium rotation angle is 0°. Accordingly, in the hologram recording medium HM 2, the absorbing linear polarization element 57 is configured so that the angle formed by the polarization axis of the absorbing linear polarization element 57 and the axis direction in which the rotation angle determined from the recorded rotation angle information is 0° is 0°.

As described above, in the second technique, when a laser beam is applied to the hologram recording medium HM 2, the reflected beam thereof is not obtained. The reflected beam of a beam of which the light source is the first laser 1 need not be obtained, but the reflected beam of a beam of which the light source is the second laser 15 need be obtained so as to read the rotation angle information recorded in the hologram recording medium HM 2.

Accordingly, the actual hologram recording medium HM 2 is configured so that the absorbing linear polarization element 57 has wavelength selectivity. That is, the absorbing linear polarization element does not perform its function on the laser beam having a wavelength of 650 nm emitted from the second laser, but transmits the incident beam.

The beam applying apparatus for implementing the second technique to cope with the hologram recording medium HM 2 having the above-mentioned configuration has the same configuration as shown in FIG. 9.

For the purpose of confirmation, it is described that the second technique is not suitable for the reproducing operation because the laser beam of which the light source is the first laser 1 is not reflected by the hologram recording medium HM 2. That is, the second technique is applicable to only a recording apparatus.

2-3. Third Technique

A third technique will be described now.

In the third technique, the reflecting film 53 reflecting a beam passing through the polarization element is omitted from the hologram recording medium HM and a hologram recording medium HM 3 having a reflecting linear polarization element 58 which is a polarization element having a function of reflecting an incident beam is used.

Figure 12:
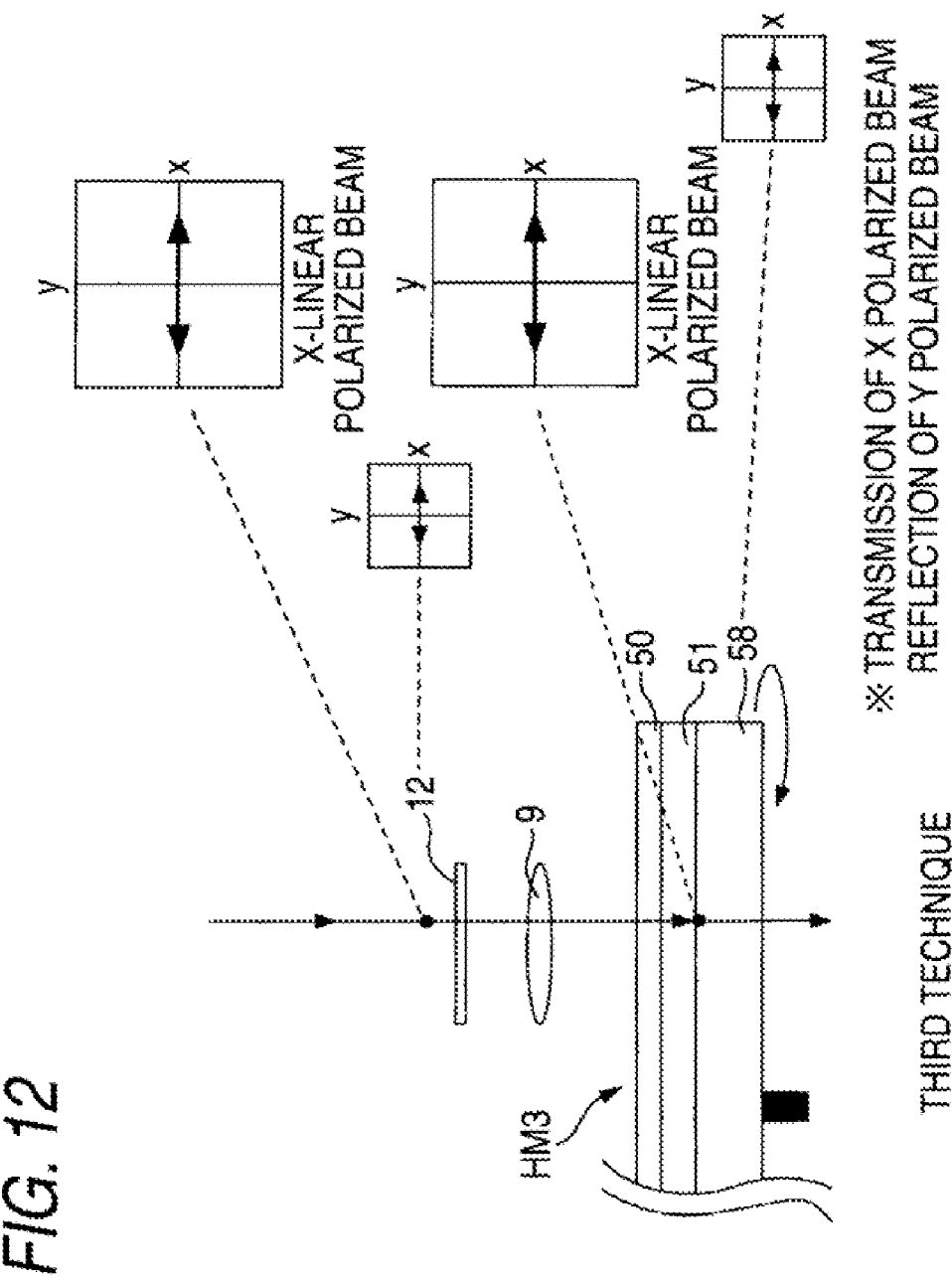
FIG. 12 is a diagram illustrating a third technique of the beam applying method according to an embodiment, where the medium rotation angle is 0°.
Figure 13:
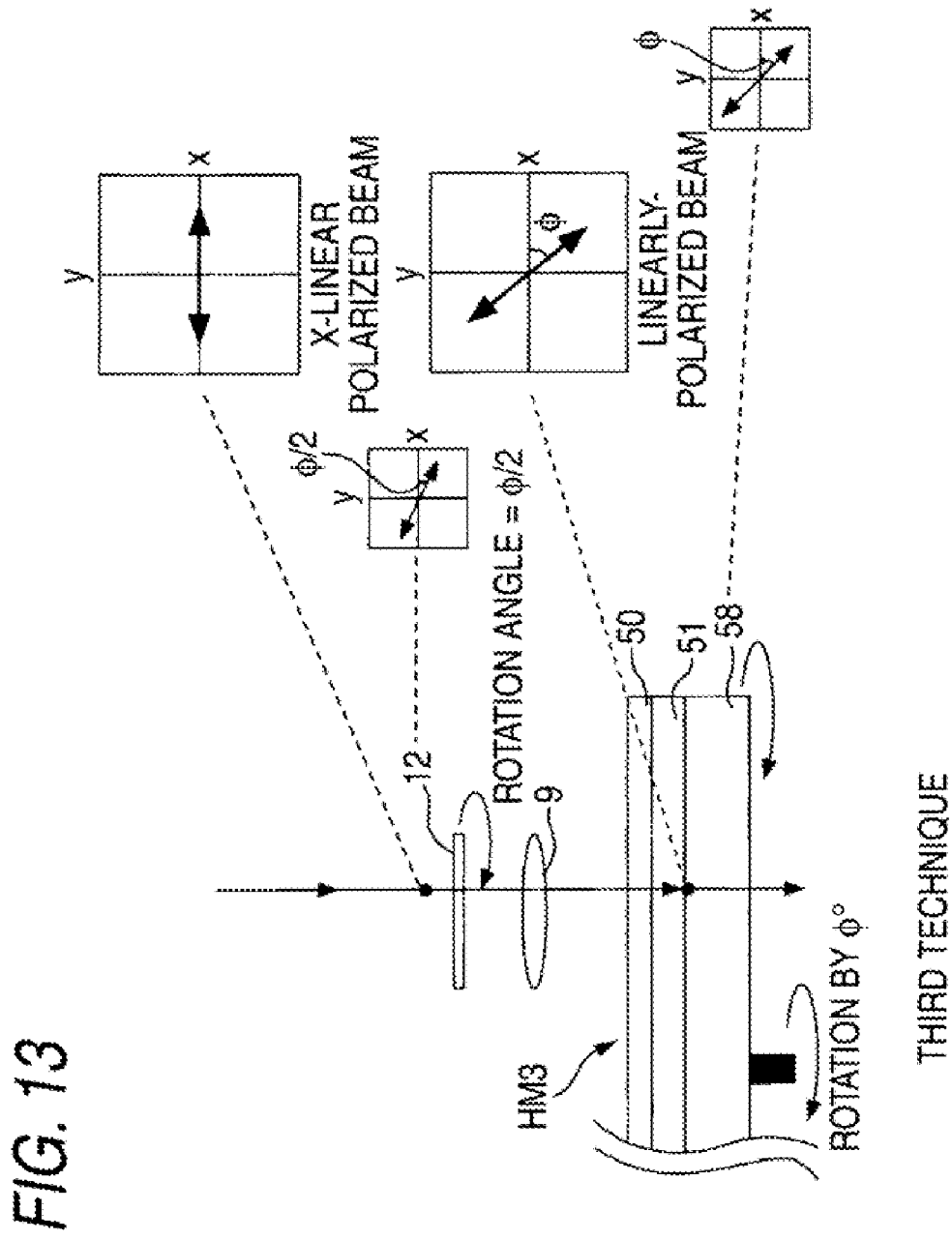
FIG. 13 is a diagram illustrating the third technique of the beam applying method according to an embodiment, where the medium rotation angle is $\phi°$.

FIGS. 12 and 13 are diagrams illustrating the third technique, where FIG. 12 shows a state that the medium rotation angle is 0° and FIG. 13 shows a state that the medium rotation angle is ϕ°.

In FIGS. 12 and 13, the polarization directions of a beam incident on the half-wavelength plate 12 of the apparatus and a beam incident on the recording layer 51 in the hologram recording medium HM 3, the optical axis direction of the half-wavelength plate 12, and the polarization axis direction of the reflecting linear polarization element 58 disposed in the hologram recording medium HM 3 are shown with respect to an X axis and a Y axis perpendicular thereto.

As shown in FIGS. 12 and 13, in the hologram recording medium HM3 of this case, the cover glass 50 and the recording layer 51 are sequentially formed from the uppermost and the reflecting linear polarization element 58 is formed as a lower layer thereof.

The reflecting linear polarization element 58 means a polarization element configured to transmit an incident beam having a polarization direction parallel to the polarization axis direction thereof and to reflect an incident beam having a polarization direction perpendicular to the polarization axis direction thereof. The reflecting linear polarization element 58 can be made of, for example, photonic crystals.

In the state where the medium rotation angle is 0° which is shown in FIG. 12, according to the third technique, the optical axis direction of the half-wavelength plate 12 of the apparatus side is parallel to the polarization direction of the incident beam. That is, the optical axis direction of the half-wavelength plate 12 is parallel to the X axis direction to correspond to the input X-linear polarized beam. Accordingly, in the state where the medium rotation angle is 0°, the X-linear polarized beam is applied to the hologram recording medium HM 3 without any change.

In the state where the rotation angle of the hologram recording medium HM 3 is 0°, the polarization axis direction of the reflecting linear polarization element 58 is parallel to the X axis direction as shown in the figure. That is, in the state that the rotation angle is 0°, the reflecting linear polarization element 58 is formed in the hologram recording medium HM 3 so that the polarization axis direction thereof is parallel to the polarization direction of the incident beam.

Since the optical axis direction of the half-wavelength plate 12 and the polarization axis of the reflecting linear polarization element 58 are set as described above, the X-linear polarized beam is applied to the hologram recording medium HM 3 from the apparatus in the state where the medium rotation angle is 0°. The applied X-linear polarized beam is incident on the reflecting linear polarization element 58, the polarization axis direction of which is the X axis direction, through the recording layer 51.

Since the reflecting linear polarization element 58 serves to transmit the incident beam of which the polarization direction is parallel to the polarization axis direction thereof, the X-linear polarized beam (forward beam) incident on the reflecting linear polarization element 58 is output through the reflecting linear polarization element 58.

Here, it is assumed in the hologram recording medium HM 3 that the reflecting film 53 is not formed below the reflecting linear polarization element 58. Accordingly, since the forward beam is output through the reflecting linear polarization element 58, the forward beam is output through the entire hologram recording medium HM 3. The third technique prevents the backward beam from being generated by the use of the above-mentioned structure.

In the third technique, the state where the medium rotation angle is φ° is exemplified in FIG. 13. Similarly to the first and second techniques, when it is assumed that the rotation angle of the half-wavelength plate 12 is θ and the rotation angle of the hologram recording medium HM 2 is φ, the half-wavelength plate 12 can be rotationally driven to maintain the relation of "θ=φ/2".

In this way, by rotationally driving the half-wavelength plate 12, the polarization direction of the beam incident on the reflecting linear polarization element 58 can be changed by φ with respect to the polarization axis of the reflecting linear polarization element 58 rotated by φ° with the rotation of the medium by φ°, thereby making the axis directions parallel to each other. Accordingly, even when the hologram recording medium HM 3 is rotationally driven, the reflecting linear polarization element 58 can transmit the incident beam. As a result, even when the hologram recording medium HM 3 is rotationally driven, it is possible to prevent the backward beam form being generated.

Since the backward beam is prevented from being generated, it is possible to prevent the reflecting hologram from being generated and to record only one kind of transmissive hologram.

When the half-wavelength plate 12 is rotationally driven with the rotation of the hologram recording medium HM 3, the third technique can employ a method using the rotation angle information recorded in the hologram recording medium HM 3.

Figure 14:
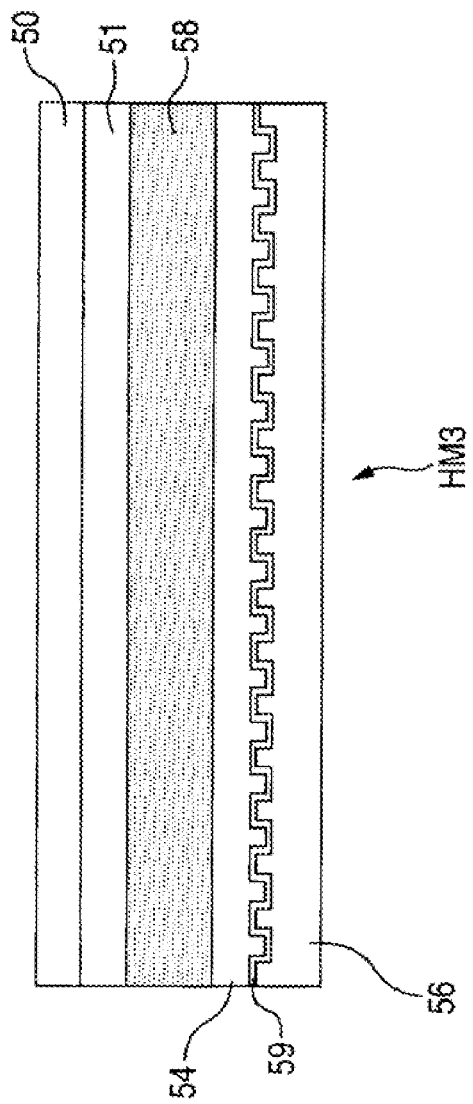
FIG. 14 is a diagram illustrating a sectional structure of a hologram recording medium used in the third technique.

FIG. 14 is a diagram illustrating a sectional structure of the hologram recording medium HM 3 when the rotation angle information is used.

As shown in FIG. 14, in the hologram recording medium HM 3, the cover glass 50, the recording layer 51, and the reflecting linear polarization element 58 are sequentially formed from the uppermost. In this case, the reflecting film 53 disposed in the first and second techniques is not formed below the reflecting linear polarization element 58, but an intermediate layer 54 is directly formed.

It should be noted that a reflecting film 59 having wavelength selectivity is used as the reflecting film to be formed on the pitted surface of the substrate 56. That is, in the third technique, as described above, the reflecting linear polarization element 58 transmits the beam incident on the hologram recording medium HM 3 and the incident beam is output through the entire hologram recording medium HM 3, thereby preventing the backward beam from being generated. However, when the reflecting film 55 not having the wavelength selectivity is formed as the reflecting film to be formed on the substrate 56, the beam passing through the reflecting linear polarization element 58 is reflected by the reflecting film 55 to generate the backward beam, thereby not establishing the third technique.

Accordingly, on the substrate 56 of the hologram recording medium HM 3, the reflecting film having the wavelength selectivity of transmitting a beam of which the light source is the first laser 1 providing a wavelength of 410 nm and reflecting a beam of which the light source is the second laser 15 providing a wavelength of 650 nm is formed as the shown reflecting film 59.

The hologram recording medium HM 3 is formed by bonding the substrate 56 having the reflecting film 59 to the underlying layer of the reflecting linear polarization element 58 by the use of an adhesive material as the intermediate layer 54.

For the purpose of confirmation, it is described that the third technique does not generate the reflected beam by allowing the reflecting linear polarization element 58 to transmit an incident beam as described above. Accordingly, even when the reflecting linear polarization element 58 does not have the wavelength selectivity, the reflected beam of a beam of which the light source is the second laser 15 can be obtained.

In the third technique, since the polarization axis direction of the reflecting linear polarization element 58 need to be parallel to the X axis direction in the state where the medium rotation angle is 0°, the reflecting linear polarization element 58 is formed in the hologram recording medium HM 3 so that the angle formed by the polarization axis of the reflecting linear polarization element 58 and the axis direction which is determined from the recorded rotation angle information and in which the rotation angle is 0° is set to 0°.

The beam applying apparatus for implementing the third technique so as to cope with the hologram recording medium HM 3 having the above-mentioned structure can have the same configuration as shown in FIG. 9.

Since the reflected beam from the hologram recording medium HM 3 is not obtained in response to the laser beam of which the light source is the first laser 1, the third technique can be applied to only the recording apparatus.

2-4. Fourth Technique

In a fourth technique, unlike the above-mentioned techniques, the rotation of the wavelength plate disposed in the apparatus is not required for preventing the reflective hologram from being generated with the rotation of the hologram recording medium HM.

Figure 15:
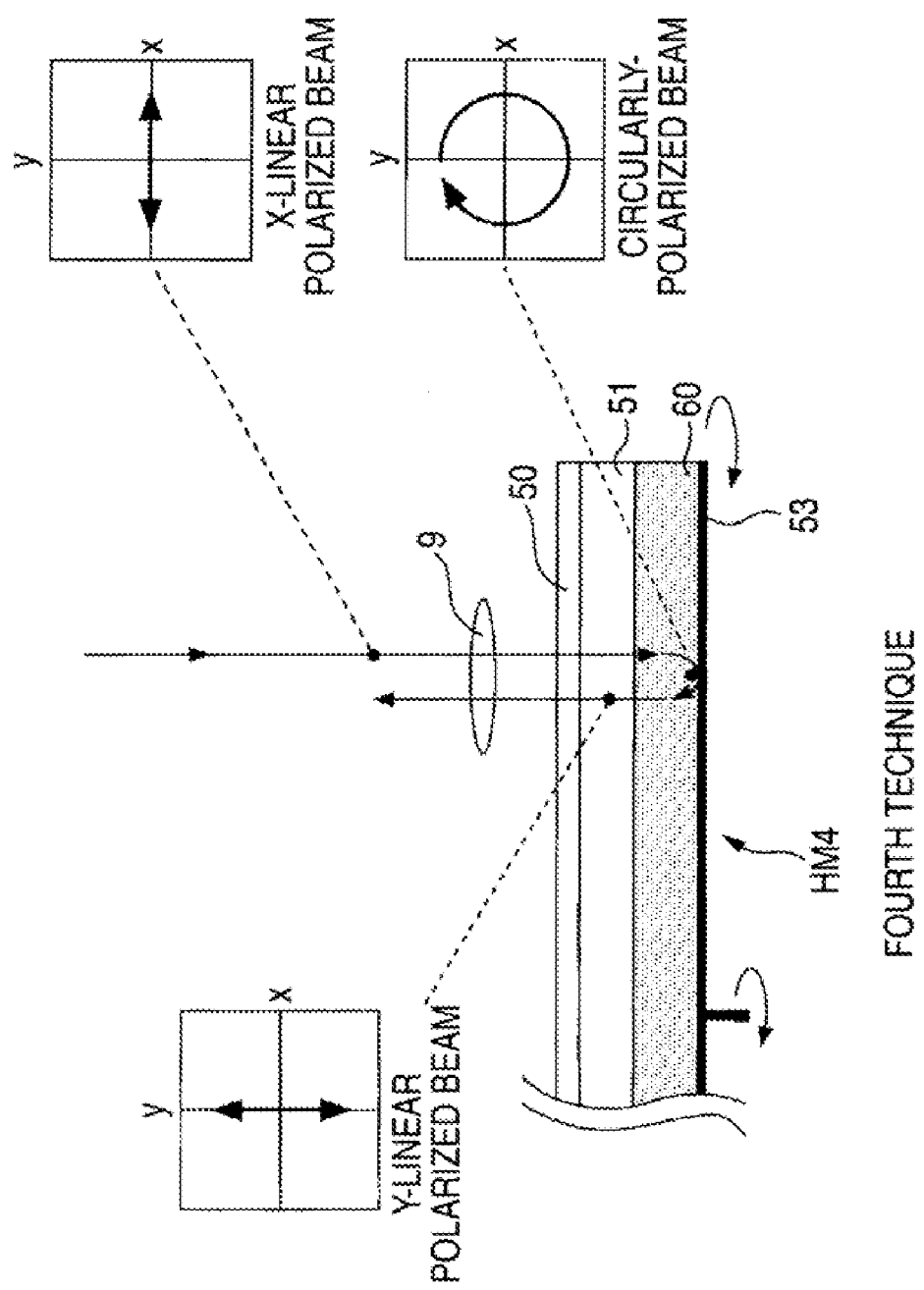
FIG. 15 is a diagram illustrating a fourth technique of the beam applying method according to the embodiment.
Figure 16:
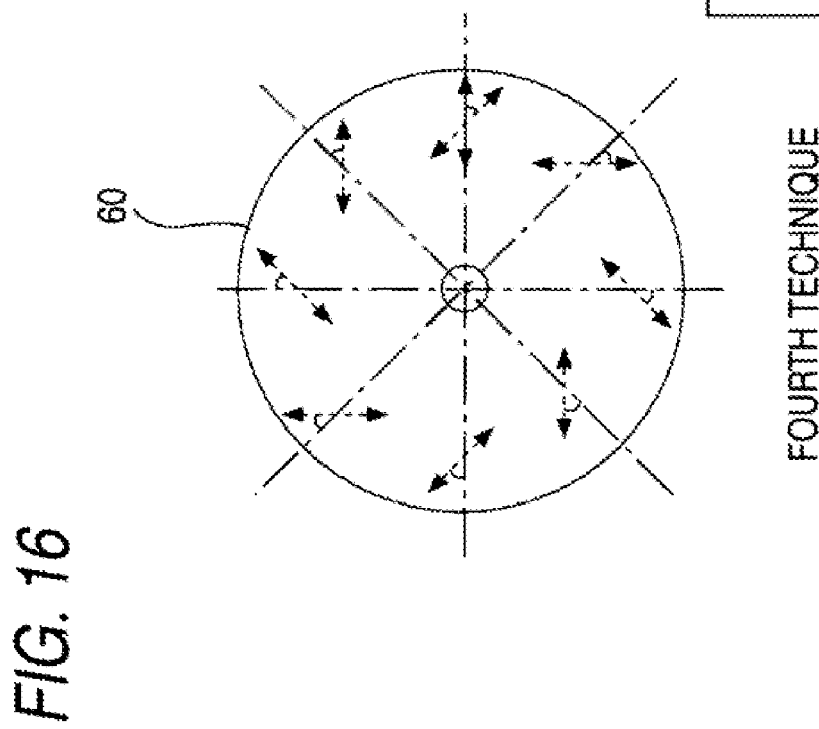
FIG. 16 is a diagram schematically illustrating a structure of a quarter-wavelength plate of a hologram recording medium used in the fourth technique.

FIGS. 15 and 16 are diagrams illustrating the fourth technique, where FIG. 15 extracts and shows a sectional structure of a hologram recording medium HM 4 used in the fourth technique and the objective lens 9 disposed in the apparatus and FIG. 16 schematically shows the structure of a quarter-wavelength plate 60 formed in the hologram recording medium HM 4.

In FIG. 15, the polarization directions of a beam incident on the objective lens 9 of the apparatus, a beam incident on the reflecting film 53 in the hologram recording medium HM 4, and a beam incident on the recording layer 51 from the reflecting film 53 are shown with respect to an X axis and a Y axis perpendicular thereto.

First, in FIG. 15, in the hologram recording medium HM 4 used in the fourth technique, a quarter-wavelength plate 60 is formed instead of the quarter-wavelength plate 52 of the hologram recording medium HM 1 used in the first technique.

In this case, as shown in the figures, the half-wavelength plate 12 is not disposed in the apparatus and the linearly-polarized beam (for example, X-linear polarized beam in this case) having a predetermined polarization direction is applied to the hologram recording medium HM 4 through the objective lens 9. That is, the linearly-polarized beam having a predetermined polarization direction is applied to the hologram recording medium HM 4, regardless of the rotation of the hologram recording medium HM 4.

In the fourth technique, the quarter-wavelength plate 60 formed in the hologram recording medium HM 4 is configured as shown in FIG. 16 so as to prevent the reflective hologram from being generated with the rotation of the medium even when the linearly-polarized beam having a predetermined polarization direction is applied.

In FIG. 16, the quarter-wavelength plate 60 is indicated by bidirectional dotted arrows and the optical axis direction continuously varies with the rotation of the hologram recording medium HM 4. Specifically, in the rotation angle directions indicated by the dot-chain lines in the figure to extend radially from a medium center position, the angle of the optical axis direction forms 45° and the optical axis direction continuously varies. The structure of the quarter-wavelength plate 60 can be obtained using, for example, photonic crystals.

As described with reference to FIG. 15, the incident beam on the hologram recording medium HM 4 is, for example, an X-linear polarized beam. That is, the incident beam on the quarter-wavelength plate 60 has the polarization directions indicated by bidirectional solid arrows in FIG. 16. Accordingly, the quarter-wavelength plate 60 having the above-mentioned structure can always set the angle formed by the optical axis direction thereof and the incident beam from the apparatus to 45° even when the hologram recording medium HM 4 is rotationally driven.

In this way, even when the hologram recording medium HM 4 is rotationally driven, the angle formed by the incident beam on the quarter-wavelength plate 60 and the optical axis direction of the quarter-wavelength plate 60 is always set to 45°. Accordingly, as shown in FIG. 15, the X-linear polarized beam incident on the medium is always converted into, for example, a right-rotated circularly-polarized beam by passing through the quarter-wavelength plate 60. When the beam passing through the quarter-wavelength plate 60 is always converted into the right-rotated circularly-polarized beam, the polarization direction of the beam (that is, backward beam) reflected by the reflecting film 53 and transmitted by the quarter-wavelength plate 60 can be always set to the polarization direction of the Y-linear polarized beam by the use of the same principle as the first technique.

In the fourth technique, when the hologram recording medium HM is rotationally driven, the polarization directions of the forward beam (X-linear polarized beam in this case) and the backward beam (Y-linear polarized beam in this case) can be kept perpendicular to each other. As a result, similarly to the above-mentioned techniques, it is possible to prevent the reflective hologram from being generated and recorded.

In the fourth technique, in order to prevent the reflective hologram from being generated with the rotation of the medium, it is necessary to apply a linearly-polarized beam having a constant direction to the hologram recording medium HM 4 as described above. In this case, it is not necessary to dispose the half-wavelength plate 12 changing the polarization direction of the incident beam with the rotation of the medium in the apparatus, unlike the above-mentioned techniques, and the configuration for rotationally driving the half-wavelength plate 12 is not required.

Figure 17:
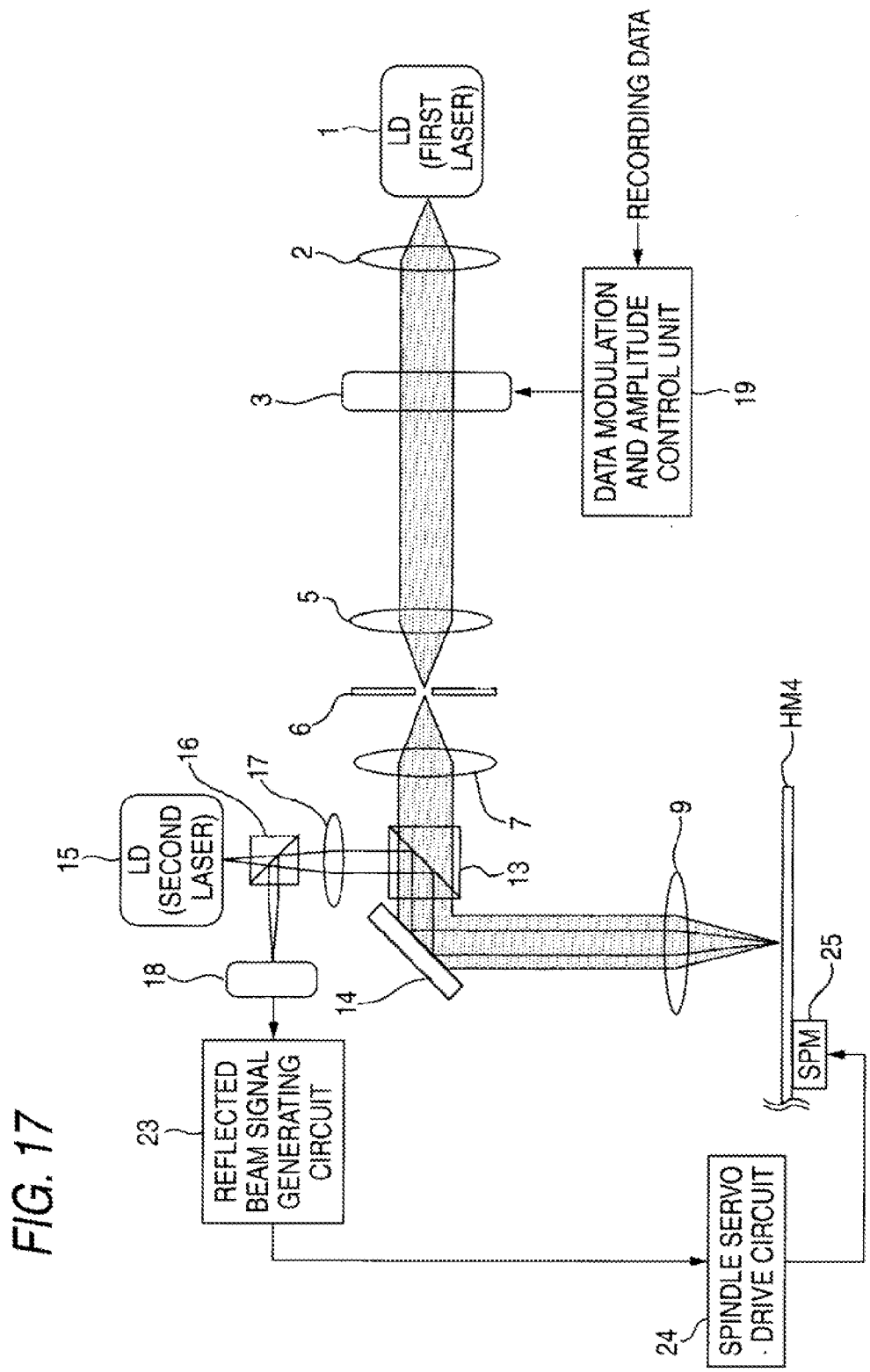
FIG. 17 is a diagram illustrating an internal configuration of a beam applying apparatus for implementing the fourth technique.

FIG. 17 shows a configuration of a beam applying apparatus that can prevent the reflective hologram from being generated to cope with the hologram recording medium HM 4 according to the fourth technique. In FIG. 17, the elements described with reference to FIG. 1 or 9 are denoted by the same reference numerals and description thereof is omitted.

As shown in FIG. 17, in the beam applying apparatus for coping with the hologram recording medium HM 4, the half-wavelength plate 12, the rotational driving unit 20, the wavelength plate rotation control unit 22, and the rotation angle information detecting unit 21 are omitted from the configuration shown in FIG. 9.

According to the fourth technique, it is possible to markedly simplify the configuration of the beam applying apparatus for preventing the reflective hologram from being generated to cope with the hologram recording medium HM 4, in comparison with the above-mentioned techniques.

As can be understood from the above description, in the fourth technique, it is not necessary to record the rotation angle information on the hologram recording medium HM 4. However, in order to perform a variety of servo control, it is necessary to form a pitted surface (including guide groove) on the substrate 56 of the hologram recording medium HM 4. That is, the hologram recording medium HM 4 has the same structure as shown in FIG. 8. Specifically, the quarter-wavelength plate 60 described with reference to FIG. 16 is formed instead of the quarter-wavelength plate 52 shown in FIG. 8.

Since it is possible to prevent the reflective hologram from being generated by obtaining the backward beam having a polarization direction perpendicular to that of the forward beam, similarly to the first technique, the fourth technique can be applied to a reproducing apparatus or a recording and reproducing apparatus as well as the recording apparatus shown in FIG. 17. When the fourth technique is applied to reproducing data, the reflective hologram can be prevented from being generated at the time of reproducing, thereby improving the SNR.

Since the specific configuration of the beam applying apparatus according to the fourth technique as the reproducing apparatus or the recording and reproducing apparatus is the same as the reproducing apparatus and the recording and reproducing apparatus described in the first technique, repeated description thereof is omitted.

In the fourth technique, the polarized beam splitter can be used as the beam splitter 4 disposed in the reproducing apparatus and the recording and reproducing apparatus, similarly to the first technique.

2-5. Fifth Technique

In a fifth technique, similarly to the fourth technique, the rotational driving of the wavelength plate in the apparatus is not required for preventing the reflective hologram from being generated.

Figure 18:
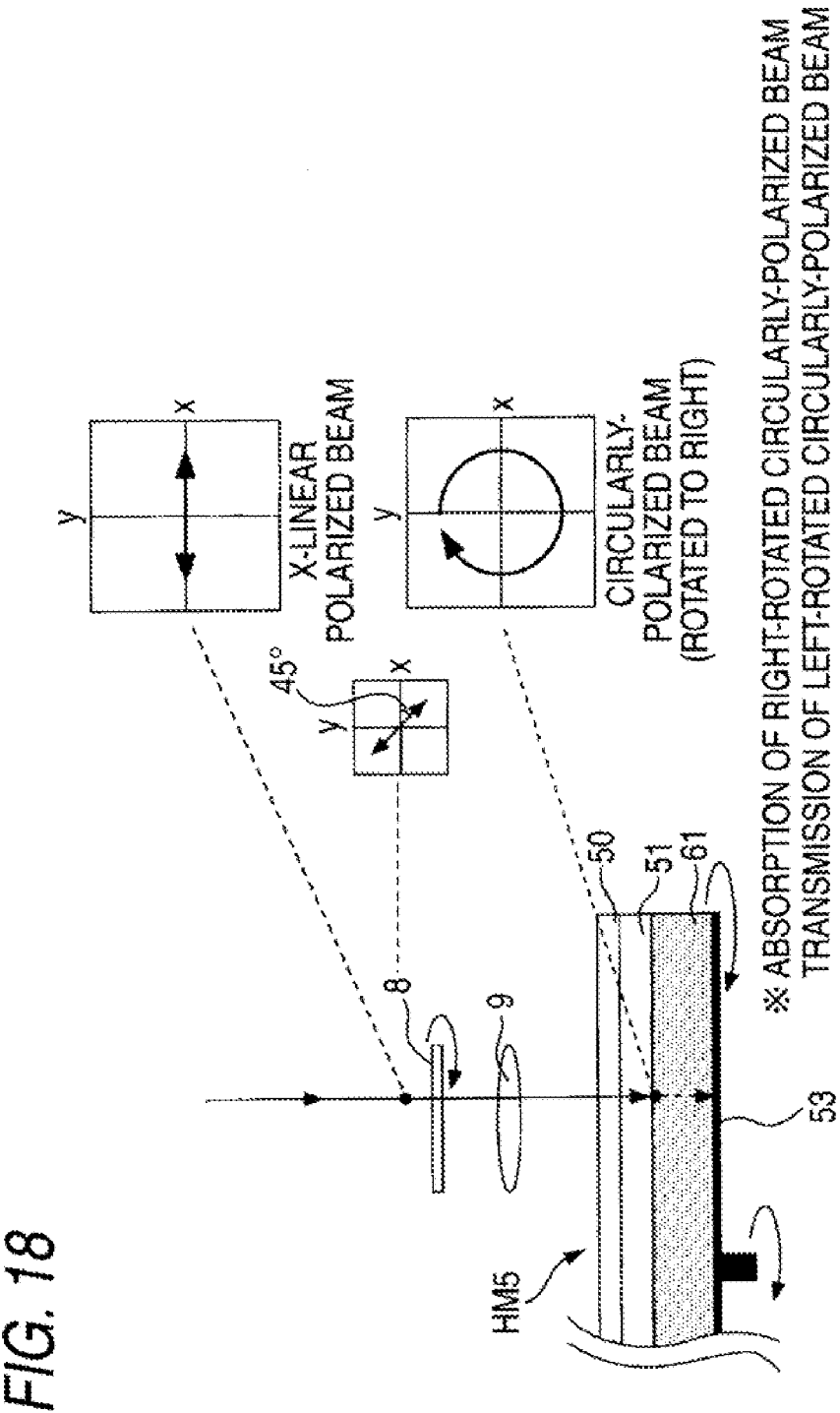
FIG. 18 is a diagram illustrating a fifth technique of the beam applying method according to the embodiment.

FIG. 18 is a diagram illustrating the beam applying method as the fifth technique, where a sectional structure of a hologram recording medium HM 5 used in the fifth technique, the objective lens 9 and the quarter-wavelength plate 8 disposed in the apparatus, and the beam applied to the hologram recording medium HM 5 through the quarter-wavelength plate 8 and the objective lens 9 are schematically shown. In FIG. 18, the polarization directions of the beam incident on the quarter-wavelength plate 8 and the beam incident on the polarization element (absorbing circular polarization element 61) formed in the hologram recording medium HM 5 are also shown.

In the hologram recording medium HM 5 used in the fifth technique, as shown in the figure, the cover glass 50, the recording layer 51, the absorbing circular polarization element 61, and the reflecting film 53 are sequentially formed from the uppermost.

The absorbing circular polarization element 61 means an absorbing polarization element having circular dichroism. That is, the absorbing circular polarization element has a characteristic of absorbing a circularly-polarized beam (for example, right-rotated circularly-polarized beam) having a predetermined rotation direction and transmitting the oppositely-rotated (left-rotated) circularly-polarized beam. An example of the absorbing polarization element having the circular dichroism as the absorbing circular polarization element 61 can include polymer materials such as cholesteric liquid crystal.

In the fifth technique, the directionally-rotated (right-rotated) circularly-polarized beam is applied to the hologram recording medium HM 5 by the use of the circular dichroism of the absorbing circular polarization element 61. Accordingly, the beam passing through the recording layer 51 can be absorbed by the absorbing circular polarization element 61, thereby not obtaining the reflected beam (that is, backward beam) from the reflecting film 53 to prevent the reflective hologram from being generated.

Accordingly, in the fifth technique, the angle formed by the optical axis direction of the quarter-wavelength plate 8 disposed in the apparatus and the polarization direction of the beam incident on the quarter-wavelength plate 8 is adjusted to 45°. Specifically, since the beam incident on the quarter-wavelength plate 8 is an X-linear polarized beam, the optical axis direction of the quarter-wavelength plate 8 is set to be inclined by 45° about the X axis direction as shown in the figure. Accordingly, as shown in the figure, the beam applied to the hologram recording medium HM 5 through the objective lens 9 may be a right-rotated circularly-polarized beam and the right-rotated circularly-polarized beam can be absorbed by the absorbing circular polarization element 61.

For the purpose of confirmation, it is described that since the absorbing circular polarization element 61 has the circular dichroism, a circularly-polarized of a predetermined rotation direction input as an incident beam can be always absorbed even when the hologram recording medium HM 5 is rotationally driven. That is, in the fifth technique, the backward beam cannot be always generated even when the hologram recording medium HM 5 is rotationally driven.

When the backward beam is prevented from being generated, similarly to the second and third techniques, it is possible to prevent the reflective hologram form being recorded and to record only one kind of transmissive hologram.

In the fifth technique, the quarter-wavelength plate 8 in which the angle formed by the optical axis direction and the polarization direction of the incident beam is fixed to 45° can be disposed in the apparatus. Accordingly, the configuration for rotationally driving the wavelength plate (quarter-wavelength plate 8 in this case) can be omitted in the apparatus. As a result, it is possible to markedly simplify the configuration of the apparatus.

In a configuration of the beam applying apparatus for preventing the reflective hologram from be generated to cope with the fifth technique, the quarter-wavelength plate 8 in which the angle formed by the optical axis direction and the polarization direction of the incident beam is fixed to 45° is interposed between the mirror 14 and the objective lens 9 in the configuration shown in FIG. 17.

In the fifth technique, the recording of the rotation angle information on the hologram recording medium HM can be omitted, but the pitted surface need to be formed in the hologram recording medium HM 5 in order to perform a variety of servo control. That is, in the actual structure of the hologram recording medium HM 5, the absorbing circular polarization element 61 is formed instead of the quarter-wavelength plate 52 shown in FIG. 8.

In the hologram recording medium HM 4, the absorbing circular polarization element 61 is configured to have the wavelength selectivity so that a laser beam of which the light source is the second laser 15 reaches the pitted surface on the substrate 56.

Since the reflected beam (backward beam) from the hologram recording medium HM is not obtained similarly to the second and third techniques, the fifth technique can be applied to only the recording apparatus.

2-6. Sixth Technique

A sixth technique employs a polarization element having circular dichroism as a polarization element used in a hologram recording medium HM similarly to the fifth technique. Here, the polarization element is not of an absorbing type but of a reflecting type, similarly to the third technique.

Figure 19:
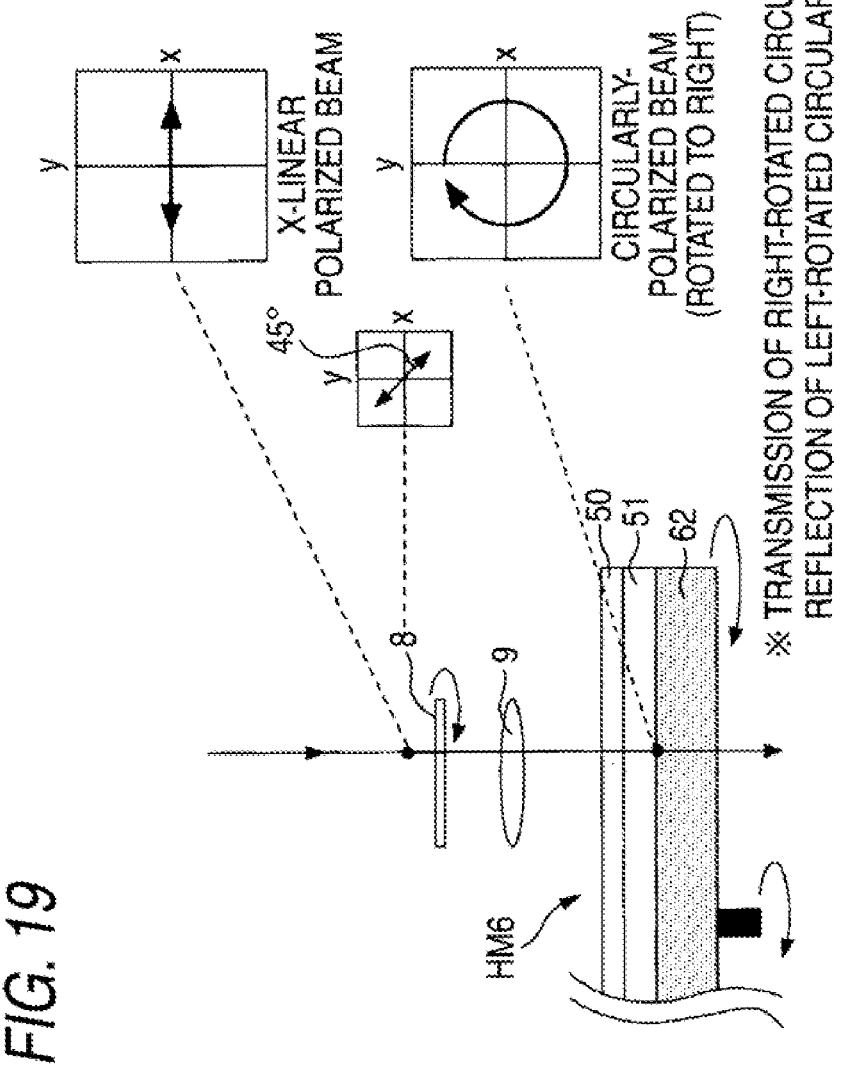
FIG. 19 is a diagram illustrating a sixth technique of the beam applying method according to the embodiment.
Figure 20A:
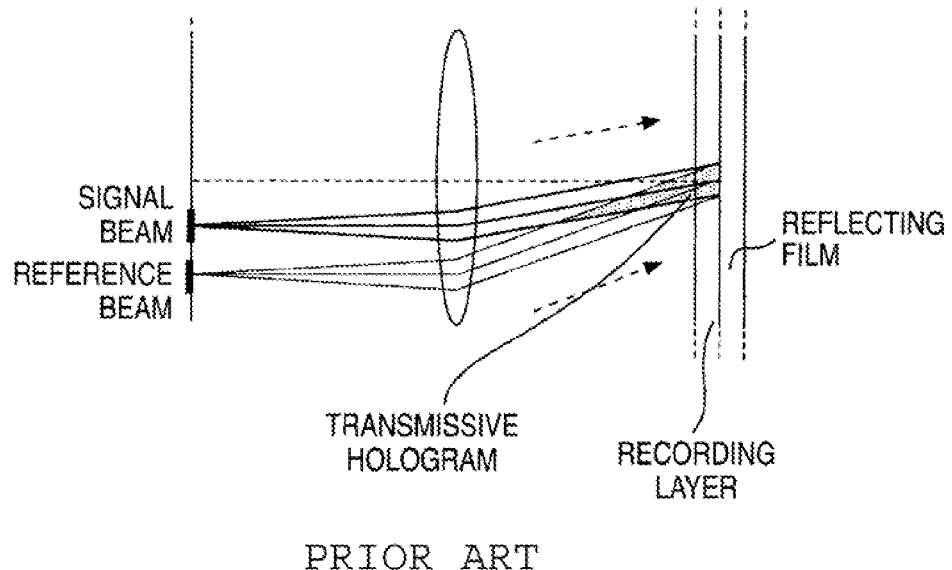
FIGS. 20A and 20B are diagrams illustrating patterns of holograms that can be generated at the time of recording data on a reflecting hologram recording medium.
Figure 20B:
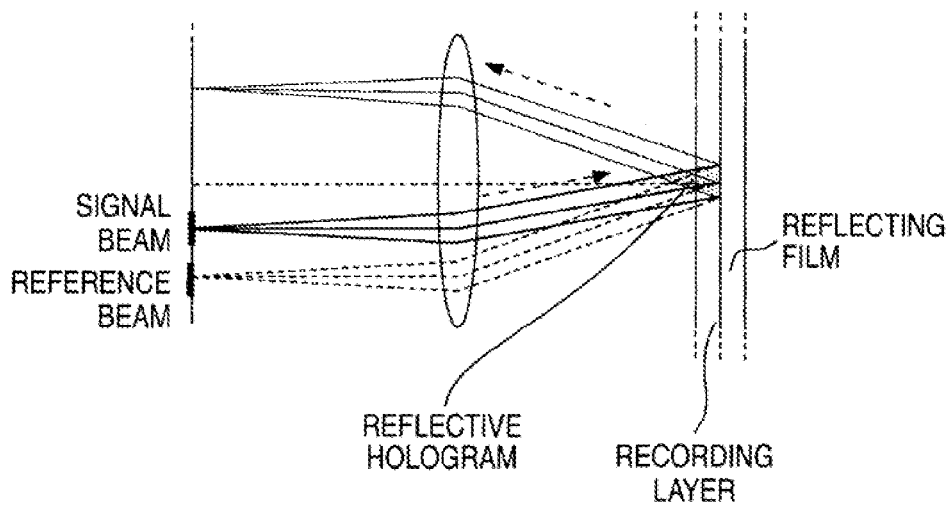
Figure 21A:
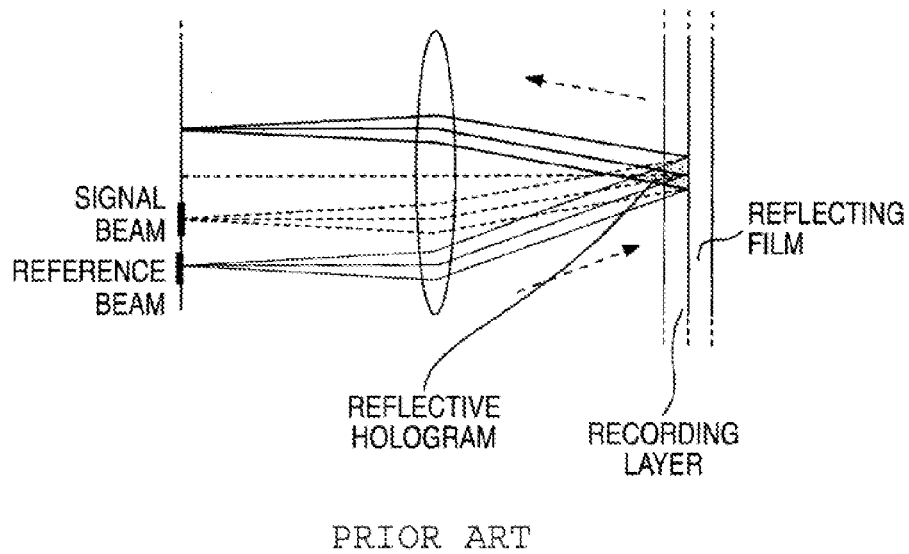
FIGS. 21A and 21B are diagrams illustrating the patterns of holograms that can be generated at the time of recording data on a reflecting hologram recording medium.
Figure 21B:
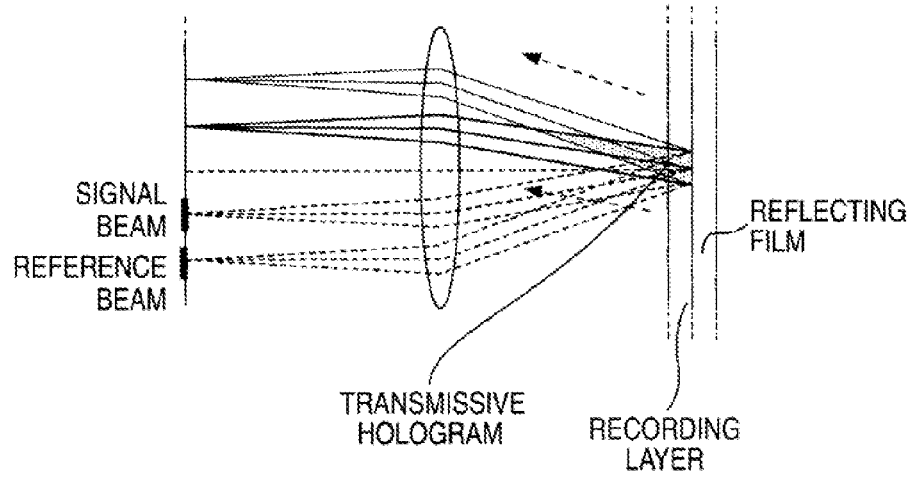
Figure 22A:
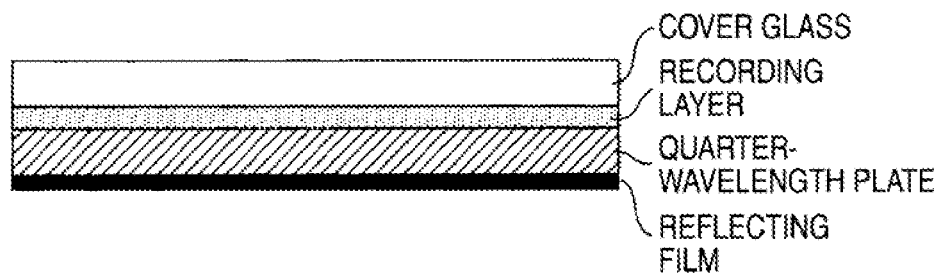
FIGS. 22A and 22B are diagrams illustrating a known method of preventing a reflective hologram from being recorded.
Figure 22B:
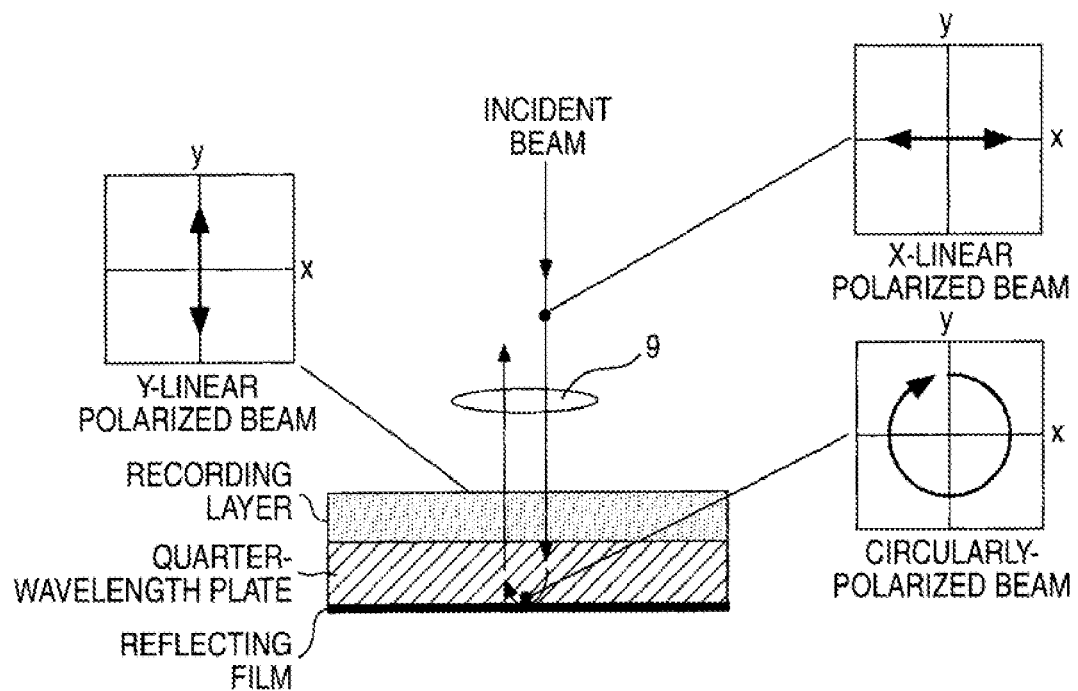

FIG. 19 is a diagram illustrating the sixth technique, where a sectional structure of a hologram recording medium HM 6 used in the sixth technique, the objective lens 9, the quarter-wavelength plate 8, and the beam applied to the hologram recording medium HM 6 through the quarter-wavelength plate 8 and the objective lens 9 are schematically shown. In FIG. 19, the polarization directions of a beam incident on the quarter-wavelength plate 8 and a beam incident on a polarization element (reflecting circular polarization element 62) disposed in the hologram recording medium HM 6 are also shown.

As shown in FIG. 19, in the hologram recording medium HM 6 used in the sixth technique, the reflecting circular polarization element 62 is formed instead of the absorbing circular polarization element 61 of the hologram recording medium HM 5. In this case, similarly to the third technique, the reflecting film 53 is omitted because the polarization element is of a reflecting type.

Here, the reflecting circular polarization element 62 is a reflecting circular polarization element having circular dichroism and has a characteristic of transmitting a circularly-polarized beam of a predetermined rotation direction (for example, right-rotated circularly-polarized beam) and reflecting a circularly-polarized beam of the opposite rotation direction (left-rotated). The reflecting circular polarization element 62 can be formed of polymer materials such as cholesteric liquid crystal.

Similarly to the fifth technique, the sixth technique serves not to generate the backward beam by applying a circularly-polarized beam of a predetermined rotation direction (right-rotated) to the hologram recording medium HM 6 by the use of the characteristic of the reflecting circular polarization element 62 having the circular dichroism.

In the sixth technique, the optical axis direction of the quarter-wavelength plate 8 disposed in the apparatus is adjusted to form an angle of 45° about the polarization direction of the beam incident on the quarter-wavelength plate 8. Specifically, since the beam incident on the quarter-wavelength plate 8 is an X-linear polarized beam, the optical axis direction of the quarter-wavelength plate 8 is set to be inclined by 45° about the X axis direction as shown in the figure.

By performing this setting operation, the beam applied to the hologram recording medium HM 6 through the objective lens 9 can be made to be a right-rotated circularly-polarized beam. In this way, since the beam applied to the hologram recording medium HM 6 is made to be a right-rotated circularly-polarized beam, the beam passing through the recoding layer 51 can be transmitted by the reflecting circular polarization element 62. That is, the beam can be output through the entire hologram recording medium HM 6, thereby not generating the backward beam.

In this case, the polarization element has the circular dichroism. Accordingly, even when the hologram recording medium HM 6 is rotationally driven, the forward beam passing through the recording layer 51 can be always transmitted by the reflecting circular polarization element 62. That is, in the sixth technique, even when the hologram recording medium HM is rotationally driven, it is possible to always prevent the backward beam from being generated, thereby preventing the reflective hologram from being generated.

According to the sixth technique, since the backward beam is not generated, it is possible to prevent the reflective hologram from being recorded and to record only one kind of transmissive hologram. In the sixth technique, similarly to the fifth technique, the quarter-wavelength plate 8 in which the angle formed by the optical axis direction and the polarization direction of the incident beam is fixed to 45° can be used in the apparatus. Accordingly, the configuration for rotationally driving the quarter-wavelength plate 8 of the apparatus can be omitted.

The beam applying apparatus for preventing the reflective hologram from being generated to cope with the sixth technique may have the same configuration as described in the fifth technique.

In the sixth technique, it is necessary to form the pitted surface in the hologram recording medium HM to perform a variety of servo control. Specifically, in the configuration of the hologram recording medium HM 3 used in the third technique and shown in FIG. 14, the reflecting circular polarization element 62 can be formed instead of the reflecting linear polarization element 58. That is, in order to prevent the beam passing through the reflecting polarization element from being reflected by the reflecting film of the recording layer (pitted surface), it is necessary to form the reflecting film 59 having the wavelength selectivity.

Since the reflected beam (backward beam) from the hologram recording medium HM is not obtained, the sixth technique can be applied to only the recording apparatus.

MODIFIED EXAMPLE

Although the embodiment of the present application has been described, the present application is not limited to the above-mentioned specific examples.

For example, although it has been described in the first to third techniques that the rotation angle information recorded in the hologram recording medium HM is read in rotationally driving the half-wavelength plate 12 with the rotation of the medium, the rotation angle information may be obtained on the basis of the detection result of the rotation angle of the spindle motor 25.

Alternatively, in addition to providing the control system using the rotation angle information, a gear box changing and outputting the rotational driving force of the spindle motor 25 may be provided and the half-wavelength plate 12 may be rotationally driven by the use of the rotational driving force from the gear box.

As can be understood from the relation "$\theta=\phi/2$" described in the first to third techniques, in order to establish the first to third techniques, the half-wavelength plate 12 can be rotated at a half the medium rotation speed. Accordingly, in the gear box, the rotational driving force of the spindle motor 25 is changed in speed and output. The rotational driving unit 20 rotationally drives the half-wavelength plate 12 on the basis of the rotational driving force output from the gear box. Accordingly, it is possible to rotationally drive the half-wavelength plate 12 so as to maintain the relation of "$\theta=\phi/2$".

However, when the technique using the gear box is employed and when the technique obtaining the rotation angle information from the rotation angle of the spindle motor 25 is employed, it is necessary to consider the attachment angle of the hologram recording medium HM to the apparatus.

In the description of the first technique with reference to FIG. 5, when the medium rotation angle is 0° as an initial state, the optical axis direction of the polarization element (quarter-wavelength plate 52) in the hologram recording medium HM and the optical axis direction of the half-wavelength plate 12 need to form an angle difference of 45°. In the description of the second and third techniques with reference to FIGS. 10 and 12, when the medium rotation angle is 0°, it is assumed that the polarization axis direction of the polarization element (the absorbing linear polarization element 57 and the reflecting linear polarization element 58) in the hologram recording medium HM is parallel to the optical axis direction of the half-wavelength plate 12 in the apparatus.

For example, when the rotation angle information is recorded in the hologram recording medium HM, it means that the medium rotation angle is displayed by the rotation angle information at a view. Accordingly, as described above, using the direction of the rotation angle of 0° defined by the recording of the rotation angle information as a reference, it is assumed that the optical axis direction (polarization axis direction) of the polarization element is a predetermined direction (45° or parallel thereto) and the optical axis direction of the half-wavelength plate 12 of the apparatus is parallel to the polarization direction of the incident beam in the state where the rotation angle of the half-wavelength plate 12 is 0°. Then, even when the medium is attached at any angle, the first to third techniques can be established by performing the rotation control corresponding to "$\theta=\phi/2$".

However, when the rotation angle information is not read from the medium such as when the rotation angle of the spindle motor 25 is used or when the gear box is used, the medium rotation angle cannot be determined at a view by the apparatus and the hologram recording medium HM is not attached to acquire the above-mentioned initial states. In this case, the first to third techniques cannot be established.

Therefore, when the technique of detecting the rotation angle of the spindle motor 25 or the technique using the gear box is employed, an attachment position determining member setting the attachment angle of the hologram recording medium HM to the apparatus to an angle at which the initial states of the techniques are obtained and the like are provided. Accordingly, even when the technique of detecting the rotation angle of the spindle motor 25 or the technique using the gear box is employed, the first to third techniques can be properly established by only performing the rotation control of "$\theta=\phi/2$."

Although it has been described that the wavelength of the first laser 1 used to record (or reproduce) a hologram is 410 nm and the wavelength of the second laser 15 used to read the information for a variety of servo control is 650 nm, the numerical values are only examples and may be properly changed in the actual configuration.

The configuration of the optical system of the beam applying apparatus described above is only an example and the present application is not limited to the configuration.

For example, although the transmissive SLM 3 has been used as the SLM 3 modulating the light intensity, the reflecting light intensity modulator such as a reflecting liquid crystal panel or a DMD (Digital Micro mirror Device) may be used.

The hologram recording medium HM is not limited to the above-mentioned configurations, but may have different configurations such as a configuration in which a polarization element is adhered to the recording layer 51 with an adhesive material and an intermediate layer is interposed between the recording layer 51 and the polarization element as a result. That is, in the optical recording medium according to an embodiment, when the polarization element is formed below the recording layer on which a signal is recorded and the polarization element is one of the quarter-wavelength plate, the absorbing linear polarization element, and the absorbing circular polarization element, a reflecting film can be formed below the polarization element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A beam applying method, comprising:
   rotationally driving an optical recording medium, in which a signal is recorded and reproduced by applying a beam thereto and which has a recording layer on which the signal is recorded, a polarization element formed below the recording layer, and a reflecting film formed below the polarization element; and
   applying a beam to the rotating optical recording medium through a half-wavelength plate that is rotationally driven with the rotation of the optical recording medium.

2. The beam applying method according to claim 1, wherein the polarization element of the optical recording medium is a quarter-wavelength plate.

3. The beam applying method according to claim 1, wherein the polarization element of the optical recording medium is an absorbing linear polarization element.

4. A beam applying method, comprising:
   rotationally driving an optical recording medium, in which a signal is recorded and reproduced by applying a beam thereto and which has a recording layer on which the signal is recorded and a reflecting linear polarization element formed below the recording layer; and
   applying a beam to the rotating optical recording medium through a half-wavelength plate that is rotationally driven with the rotation of the optical recording medium.

5. A beam applying apparatus, comprising:
   medium rotating means for rotationally driving an optical recording medium in which a signal is recorded and reproduced by applying a beam thereto;
   an optical system configured to guide the beam emitted from a light source to the optical recording medium;
   a half-wavelength plate inserted at a predetermined position in an optical path of the optical system; and
   wavelength plate rotating means for rotationally driving the half-wavelength plate with the rotation of the optical recording medium.

6. The beam applying apparatus according to claim 5, further comprising angle detecting means for detecting a rotation angle of the optical recording medium,
   wherein the wavelength plate rotating means rotationally rotates the half-wavelength plate on the basis of the detection result of the wavelength detecting means.

7. The beam applying apparatus according to claim 6, wherein the angle detecting means detects the rotation angle by reading rotation angle information recorded in advance in the optical recording medium.

8. The beam applying apparatus according to claim 5, wherein the wavelength plate rotating means includes a gear box configured to change and output a rotational driving force of the medium rotating means and rotationally drives the half-wavelength plate on the basis of the rotational driving force output from the gear box.

9. The beam applying apparatus according to claim 5, wherein the optical recording medium is a hologram recording medium in which the signal is recorded in the recording layer by the use of an interference pattern of a reference beam and a signal beam, and
   wherein the beam applying apparatus further comprises intensity modulating means for outputting the signal bean and/or the reference beam by modulating the intensity of the beam from the light source at a predetermined position of the optical system.

* * * * *